US011854092B1

(12) United States Patent
Nelson et al.

(10) Patent No.: US 11,854,092 B1
(45) Date of Patent: Dec. 26, 2023

(54) SYSTEMS AND METHODS FOR TAX COMPLIANCE AND DELINQUENCY RESOLUTION

(71) Applicants: Elizabeth Nelson, Marina del Rey, CA (US); Philipp Waltert, Marina del Rey, CA (US); Charles Taylor, Torrance, CA (US)

(72) Inventors: Elizabeth Nelson, Marina del Rey, CA (US); Philipp Waltert, Marina del Rey, CA (US); Charles Taylor, Torrance, CA (US)

( * ) Notice: Subject to any disclaimer, the term of this patent is extended or adjusted under 35 U.S.C. 154(b) by 375 days.

(21) Appl. No.: 15/594,425

(22) Filed: May 12, 2017

Related U.S. Application Data

(63) Continuation-in-part of application No. 14/044,835, filed on Oct. 2, 2013, now abandoned.

(51) Int. Cl.
*G06Q 40/00* (2023.01)
*G06Q 40/12* (2023.01)
*G06Q 40/10* (2023.01)

(52) U.S. Cl.
CPC .......... *G06Q 40/123* (2013.12); *G06Q 40/10* (2013.01)

(58) Field of Classification Search
CPC ...................................................... G06Q 40/00
See application file for complete search history.

(56) References Cited

U.S. PATENT DOCUMENTS

| | | | | |
|---|---|---|---|---|
| 5,822,741 A * | 10/1998 | Fischthal | ................. | G06K 9/62 706/16 |
| 2010/0153138 A1 * | 6/2010 | Evans | .................... | G06Q 10/10 705/4 |
| 2011/0066650 A1 * | 3/2011 | Fuxman | ............. | G06F 16/3349 707/776 |
| 2012/0023006 A1 * | 1/2012 | Roser | ..................... | G06Q 40/00 705/38 |

* cited by examiner

*Primary Examiner* — Scott S Trotter
(74) *Attorney, Agent, or Firm* — Omni Legal Group; Omid E. Khalifeh; Ariana K. Sontoro

(57) ABSTRACT

Systems and methods for simultaneously presenting to a user with a plurality of available options for resolving delinquent debts to local, state and national tax authorities and providing the user with appropriate documentation to resolve his/her delinquency status based on a selected option. The system uses all available information from the tax agency website and personal information of the taxpayer, such as expenses and income, to compute the most favorable resolution solution for the taxpayer. The system further uses deep learning to ranks the generated options based on previously accepted solutions by the tax agency.

12 Claims, 37 Drawing Sheets

| File | Edit | Help | | |
|---|---|---|---|---|
| | | | | & User: Primary Taxpayer |

| Home | Personal | Assets | Business | Expenses | Qualify | File |
|---|---|---|---|---|---|---|

| Profile | Dependents | Amount Owed | Compliance | Marital Status | Address |
|---|---|---|---|---|---|

Compliance Status

It is required that the taxpayer file his own last 6 years delinquent tax return(s) or has a Tax Professional prepare and file the delinquent return before any settlement can be negotiated with the IRS.

○ Yes  ● No   Have you filed all your tax returns?

○ Yes  ● No   Are you in active bankruptcy?

○ Yes  ● No   Are you in active audit?

○ Yes  ● No   Has the I.R.S. already accepted an Offer in Compromise? ⓘ

○ Yes  ● No   In the last 5 years, have you (and your spouse if applicable) filed all tax returns on time, paid all taxes due on time and have no other installment agreements? ⓘ

[ BACK ]   [ NEXT ]

QUICK TIPS

Show Tips

Select No if you are not in a Bankruptcy procedure

| Employer Name | Gross Pay | Currently Employed? | | |
|---|---|---|---|---|
| Employer A | $20.00 | Yes | Edit | Delete |
| Employer B | $20.00 | Yes | Edit | Delete |
| Employer C | $20.00 | Yes | Edit | Delete |

Employment : Primary Taxpayer

Please add all employers you currently work for at this time.

Add New Job

Home | Personal | Assets | Business | Expenses | Qualify | File

Overview | Employment | Real Estate | Vehicles | Other Assets | Household

QUICK TIPS — Show Tips
Add, Edit or Delete any Employers you may have.

User: Primary Taxpayer

BACK | NEXT

File Edit Help

Ready | Online

Non-Wage Household Income

List MONTHLY amounts. For Self-Employment, list the monthly amount received after expenses.

Alimony Income: $0.00
Interest Income: $0.00
Social Security Income: $0.00
Child Support Income: $0.00
Unemployment Income: $0.00
Other Income: $0.00
Net Self-Employment Income: $0.00
Pension Income: $0.00

QUICK TIPS — Show Tips
If you are the beneficiary of any other income not stated above, enter the nature and the amount of the payment

BACK | NEXT

Checking, Savings and Retirement Accounts

Includes Banking Institutions, Checking and Savings Accounts, Credit Unions, Certificates of Deposit, Individual Retirement Accounts, (IRAs), Keogh Plans, Simplified Employee Pensions 401(k) Plans, Profit Sharing Plans, Mutual Funds and Stock Brokerage Accounts.

[Add New Account]

| Name of Institution | Account Number | Type of Account | Current Balance | | |
|---|---|---|---|---|---|
| XW | 1 | Checking | $0.00 | Edit | Delete |
| XX | 2 | 401K | $0.00 | Edit | Delete |
| XY | 3 | Savings | $0.00 | Edit | Delete |
| XZ | 4 | Money Market | $0.00 | Edit | Delete |

QUICK TIPS

Show Tips

Add, Edit or Delete any Accounts.

[BACK] [NEXT]

| File Edit Help | | | | | | | — 🔲 ⊠ |
|---|---|---|---|---|---|---|---|
| | | | | | | | & User: Buck Brady |
| Home | Personal | Assets | Business | Expenses | Qualify | File | |

| Resolution | Filing Decision | | |
|---|---|---|---|

Qualify

Status: Currently Not Collectible

GREAT NEWS!

Based on you answers, Buck Brady, we have calculated that your allowable living expenses exceed your current income. This means you qualify for what the IRS calls "Currently not Collectible" status, also known as CNC.

Once a taxpayer is granted CNC status, the IRS must stop all collection activities including payroll garnishments and bank levies. This Status is reviewed by the IRS every 18 to 24 months to determine if your expenses still exceed your income, based on your most recent tax returns. If your income increases and the IRS then determines you can make monthly payments, at some point you will have to begin making a monthly payment based on your "Disposable Income" until the Collection Statute Expiration Date has been reached unless you return to CNC status at a later date.

Buck Brady, you currently owe $39,595.90 to the IRS but you will not make any payments to the IRS as long as your CNC status is maintained. Your debt is still there but you will not be a target of IRS collection efforts. If the IRS later determines that you can make a payment, we recommend getting the latest edition of our software to negotiate the most advantageous payment plan. Do not trust the IRS to do this for you; they are in the business of collecting as much money as possible. We on the other hand are in the business of finding the lowest tax debt settlement legally possible.

⊙ BACK    NEXT ⊙

QUICK TIPS
Show Tips
Enter your current street address

File Edit Help

& User: Buck Brady

Home | Personal | Assets | Business | Expenses | File

Resolution | Filing Decision

Qualify

Status: Installment Agreement

GREAT NEWS!

Based on you answers, Buck Brady, we have calculated what the IRS calls your monthly "disposable income". The calculated amount is $224.57. This will be the amount of your monthly payment on your tax debt to the IRS. You currently owe the IRS $39,595.90.

The longest you will pay the IRS the above mentioned amount for a maximum of 10 years (120 months) amounting to $26,948.40. The actual time period depends entirely on your Collection Statute Expiration Date (CSED)*. If your CSED is just 48 months away for example, you would then only pay $10,779.36 on your $39,595.90 IRS tax debt.

*For information about CSED, click here.

QUICK TIPS

Show Tips

Add, Edit or Delete any Real Estate properties you currently own or owned the last time you field.

BACK | NEXT

Ready | Online

FIG. 31

| File Edit Help | | | | | | | — 🔲 ❌ |
|---|---|---|---|---|---|---|---|
| Home | Personal | Assets | Business | Expenses | Qualify | File | & User: Buck Brady |

| Resolution | Filing Decision | | ⚙ QUICK TIPS |
|---|---|---|---|
| Qualify | | | Show Tips |
| | | | Enter the name of the Bank from which your automatic debit will be set up by the IRS will be set up |

Status: Installment Agreement

GREAT NEWS!

Based on you answers, Buck Brady, you qualify for what the IRS calls a "Streamline Installment Agreement". Your monthly payment to the IRS will be $555.57 for 72* months. This payment schedule does not require your full financial disclosure to the IRS.

You must however fill out your checking account information for a "Direct Debit Installment Agreement", a necessary condition for the IRS to accept this payment schedule without full financial disclosure.

If you do not have a checking account or you do not want to disclosure this information, the IRS will require full financial disclosure which this software program will provide for you. In this case, your monthly payment would be $555.57 for 72 months Additionally, due to the very high default rate on Installment Agreements without bank account information, the IRS will in most cases deny requests for Installment Agreements.

*If your CSED runs out earlier, the IRS may raise the amount of your monthly payment. If your monthly disposable income $555.57 is lower than this increased amount, the IRS has to accept the lower monthly payment amount until CSED runs out.

*For more information about CSED, click here.

⊙ BACK    NEXT ⊙

Ready                                                                    Online

FIG. 32

File Edit Help

User: Buck Brady

| Home | Personal | Assets | Business | Expenses | Qualify | File |

| Resolution | Filing Decision |

Filing Decision

Filing: Contacting the IRS to negotiate your settlement

○ COMING SOON!! LET US NEGOTIATE WITH THE IRS ON YOUR BEHALF!
If you do not want to contact the IRS to request your payment plan, you can hire our company to contact the IRS for you. Our price for these services is charged according to how fast that you need this information, and how fast you must have your levy released. Our fees to contact the IRS and request a resolution for 1) a payroll levy(s) release, and/or 2) a bank levy release and/or request the Installment Agreement are listen on the next page.

● I WILL CONTACT THE IRS MYSELF!!
We will provide you with all the forms and information you need to successfully negotiate a tax settlement with the IRS yourself! Please click next to continue.

⚙ QUICK TIPS

Show Tips

I will contact or visit my local IRS office, present my offer and conduct my own Tax Resolution negotiations

[ BACK ]  [ NEXT ]

Ready      Online

| Tandem Sheet To From 433-F | IRS PAYMENT PLAN APPLICATION Analysis Of Income, Allowable Expenses and Disposable Income |
|---|---|

| Name(s) and Address | Your Social Security Number or ITIN |
| | Your Spouse's Social Security Number or ITIN |
| County of Residence: | Your Telephone Numbers<br>Home:<br>Work:<br>Cell: | Spouse's Telephone Numbers<br>Home:<br>Work:<br>Cell: |

Total Amount Owed to the IRS:

A. TOTAL MONTHLY INCOME STREAM  (All Employment, Net Self-Employment and Other Income Included)

A1. WAGE INFORMATION MONTHLY INCOME
Your Total Monthly Wages: _____   Your Spouse's Total Monthly Wages: _____

A2. NON-WAGE HOUSEHOLD INCOME

| | | | |
|---|---|---|---|
| Alimony Income: | | Pension Income: | |
| Child Support Income: | | Interest Income: | |
| Net Self-Employment Income: | | Social Security Income: | |
| Net Rental Income: | | Other Income: | |
| Unemployment Income: | | TOTAL MONTHLY INCOME: | |

B. TOTAL MONTHLY LIVING EXPENSES  (Showing Actual, Allowable and Maximum Allowable Expenses)

| | Actual Expenses | Allowable Expenses | IRS Max. Allowable | | Actual Expenses | Allowable Expenses | IRS Max Allowable |
|---|---|---|---|---|---|---|---|
| National Standard, Food, Clothing and Other Items: | | | | Voluntary Retirement: | | | |
| H — Mortgage or Rent: | | | | T — Federal: | | | |
| O  Electricity, Gas, Water, Sewage and Garbage: | | | | A  State: | | | |
| U  Phones, Landline and Cells: | | | | X  City: | | | |
| S  Homeowner Insurance: | | | | E  FICA/Social Security: | | | |
| I  R.E. Tax & Insurance: | | | | S  Medicare: | | | |
| N  Maintenance, Repairs: | | | |    Disability: | | | |
| G  Vehicle Payment 1: | | | |    Workman's Comp: | | | |
|    Vehicle Payment 2: | | | |    Child / Disabled Care: | | | |
| Vehicle Operating Costs: | | | | Student Loans: | | | |
| Health Insurance: | | | | Court Ordered payments: | | | |
| Out of Pocket Health Care: | | | | Credit Cards: | | | |
| Whole Life Insurance: | | | | O  1 - Additional Food: | | | |
| Term Life Insurance: | | | | T  2 - Medical: | | | |
| Profit and Loss Statement: | | | | H  3 - Transportation: | | | |
| Estimated Tax Payments: | | | | E<br>R  TOTAL MONTHLY EXPENSES: | | | N/A |
| Employer Mandated Retirement: | | | | | | | |

ATTACHMENT TO IRS FORM 433-F (REV 1-2013)   ALL RIGHTS RESERVED   PAGE 1 OF 2

*FIG. 36*

| C. DISPOSABLE INCOME ANALYSIS | (Showing Net Disposable Income According to IRS Collection Financial Standards) | | |
|---|---|---|---|
| Total Monthly Income Stream: | | Total Disposable Monthly Amount: | |
| Total Monthly Allowable Expenses: | | Monthly Payments to the IRS: | |

D. DEBT RESOLUTION SELECTION (Currently not Collectible or Installment Agreement)

D1. Currently Not Collectible

| G My current allowable expenses exceed my income by $ _____ therefore and at this time I qualify for the IRS "Currently not Collectible" Status. | The Amount of My Monthly Payment to the IRS will be: | CNC* = $0.00 |
|---|---|---|

* Being "Currently not Collectable" does not mean the debt goes away. It means that the IRS has determined I cannot afford to pay the debt at this time. Penalties and interest will continue to be added to the debt.

D2. I Owe Less Than $10,000 to the IRS

| G I owe $ _____ to the IRS and I do qualify for a "Guaranteed Installment Agreement". I meet all the required conditions below. | The Amount of My Monthly Payment to the IRS will be: | |
|---|---|---|

My request cannot be turned down because I comply with the following IRS requirements:
- During the past 5 tax years, I (and my spouse filing a joint return) have timely filed all income tax returns and paid any income tax due, and have not entered into an installment agreement for payment of income tax.
- I cannot pay the tax owed in full when it is due and give the IRS the information needed to confirm that determination.
- I agree to pay the full amount I/we owe within 3 years and to comply with the tax laws while the agreement is in effect.

D3. Installment Agreement

| G I owe $ _____ to the IRS but my income only exceeds my current allowable expenses by $ _____ which is the highest amount I can afford to pay monthly. | The Amount of My Monthly Payment to the IRS will be: | |
|---|---|---|

My "Disposable Income" as calculated by IRS "Collection Financial Standards" will be the amount of my monthly payment to the IRS.

D4. Full Pay Installment Agreement

| G I owe $ _____ to the IRS. My disposable income allows me to pay my debt in full over _____ months. | The Amount of My Monthly Payment to the IRS will be: | |
|---|---|---|

My "Disposable Income" as calculated by IRS "Collection Financial Standards" will be the amount of my monthly payment to the IRS.

Under penalty of perjury, I declare to the best of my knowledge and belief this statement of assets, liabilities and other information is true, correct and complete.

| Your Signature | Your Spouse's Signature | Date |
|---|---|---|

E. Important Information For IRS Agents and IRS Personnel Processing This Form:

The EZTAX$OLVER Software program has painstakingly incorporated all allowable expenses as delineated by the "Collection Financial Standards" in effect since last IRS revision, March 1, 2011.

These include all National Standards for Food, Clothing and Other Items; Out of Pocket Health Care Costs; National Standards for Vehicle Ownership and Local Standards for Vehicle Operating Costs and Local Standards for Housing and Utilities.

Our EZTAX$OLVER Software most carefully calculates the maximum legal amount a taxpayer is able to pay to the IRS based on nearly 140,000 financial collection data point supplied by the IRS.

ATTACHMENT TO IRS FORM 433-F (REV 1-2013)     ALL RIGHTS RESERVED     PAGE 2 OF 2

*FIG. 36 (Contd)*

SYSTEMS AND METHODS FOR TAX COMPLIANCE AND DELINQUENCY RESOLUTION

CROSS-REFERENCE TO RELATED APPLICATIONS

The present application is a Continuation-In-Part application of U.S. patent application Ser. No. 14/044,835, filed Oct. 2, 2013, now abandoned, which claims priority to U.S. Provisional Application No. 61/709,145 filed Oct. 2, 2012, specifications of which are hereby incorporated by reference in their entirety.

BACKGROUND OF THE INVENTION

Field of the Invention

The field of the invention relates to systems and methods for tax delinquency resolution and analysis, and more particularly to systems and methods for presenting to a user acceptable options for resolving delinquent tax debts to local, state and/or national tax authorities and providing the user with appropriate documentation to resolve his/her delinquency status based on a selected option.

Description of the Related Art

Tax and accounting rules and regulations have become increasingly complex, causing many taxpayers to not report or under-report in their tax returns and consequently owe the government money that they must repay. The rules and regulations are equally, if not more, difficult when dealing with the complex repayment structures that are typical of tax agencies, e.g. the Internal Revenue Service (IRS) tax resolution repayment options. For example, a taxpayer repayment structure includes deductions for multiple expenses. However, the IRS's current tax rules and regulations do not provide a system, methodology or appropriate documentation to calculate and to set up a repayment structure based on a taxpayers current earnings and all their allowable expenses. The current systems for repayment calculations, available on the IRS website for example, are not structured for inputting any of the allowable expenses to compute repayment options. Instead, the IRS simply provides for a repayment plan of 72 months, i.e. the system simply takes what the taxpayer owes in delinquent taxes and divides it by 72 months to arrive at a repayment schedule. Other available systems are configured to only recognize certain taxpayer expenditures as actual expenses, while most taxpayer expenses are not accounted for. Because of the limitations of current systems, a taxpayer is not able to determine what is an acceptable repayment plan for their tax delinquency based on their actual disposable income.

In addition, based on the taxpayer's earnings, allowable expenses, disposable income and overall financial situation, there may be one or more alternately acceptable repayment plans or resolutions. However, current systems are not capable of presenting the taxpayer with all the alternatives, including a preferred resolution option, based upon what they can afford to pay each month to the tax agency, e.g. IRS. Because these alternatives are not presented to the taxpayer, it is possible that the taxpayer will forfeit potential repayment savings/advantages. Taxpayers may also have to hire tax professionals to analyze the alternatives for them at great expense and still not get the optimum advice. This is because allowable charts and information within the IRS systems are difficult to find and understand, and are not readily available or known to taxpayers. For example, currently there are about 144,000 data points within the IRS database that may affect computation of acceptable repayment schedule for a tax delinquency. Even some professional tax services personnel may not know all these data points and rules to adequately help and represent the taxpayers who require solutions acceptable to the IRS.

Accordingly, systems and methods for generating tax delinquency resolution and analysis that provides the taxpayer acceptable and optimum tax repayment solutions is desirable.

BRIEF SUMMARY OF THE INVENTION

The invention relates to systems and methods for tax delinquency resolution and analysis. In one or more embodiments, the system takes a taxpayer's financial information, e.g. personal data, tax delinquency information, assets, and expenses, then using data obtained from a tax agency's website, computes and presents to a user a plurality of available and acceptable options for resolving delinquent taxes owed to tax agency and also providing the user with appropriate documentation to resolve his/her delinquency status based on a selected option. The selected option may be based on analysis by a trained deep learning algorithm using information available from the tax agency website, previously acceptable resolutions to the tax agency, or as identified by an expert.

In one or more embodiments, a software application may present the user with (a) a financial analysis chart generated based on a tax authority's published allowable expenses data, and the user's actual expense provided by the user; (b) a plurality of options for repayment based on the data used to generate the financial analysis chart, including the most optimal repayment option; (c) information regarding any programs of the tax authority related to the release of liens or levies.

In one or more embodiments, the system includes a tax delinquency resolution and analysis server system communicatively coupled through a network to one or more user devices to provide solutions to resolve tax delinquencies, and a user account database coupled to the tax delinquency resolution and analysis server system to store information including an account and at least one username for each of the plurality of users. The tax delinquency resolution and analysis system may be configured to ask the user a series of questions, calculate solutions, and provide solutions for display and printing. The tax delinquency resolution and analysis server system is configured to communicate with the tax agency's (e.g. Internal Revenue Service or other federal or state tax authority) computer systems to retrieve data points and/or current tax codes. The tax delinquency resolution and analysis system further comprises an inference engine to infer one or more information based on answers to one or more previous questions. One or more of the solutions provided by the tax delinquency resolution and analysis system should be acceptable to the tax agency, e.g. IRS. The tax delinquency resolution and analysis server system further provides instructions for negotiation with the tax agency.

The tax delinquency resolution and analysis system is a stand-alone application on a user device or the user device may act as a thin client to the analysis server system.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIGS. 6 to 35 are exemplary user interfaces illustrating guidelines, instructions, and questions according to an embodiment of the present invention.

FIG. 36 is an exemplary delinquent tax solution output according to an embodiment of the present invention.

DETAILED DESCRIPTION

Figure 1:
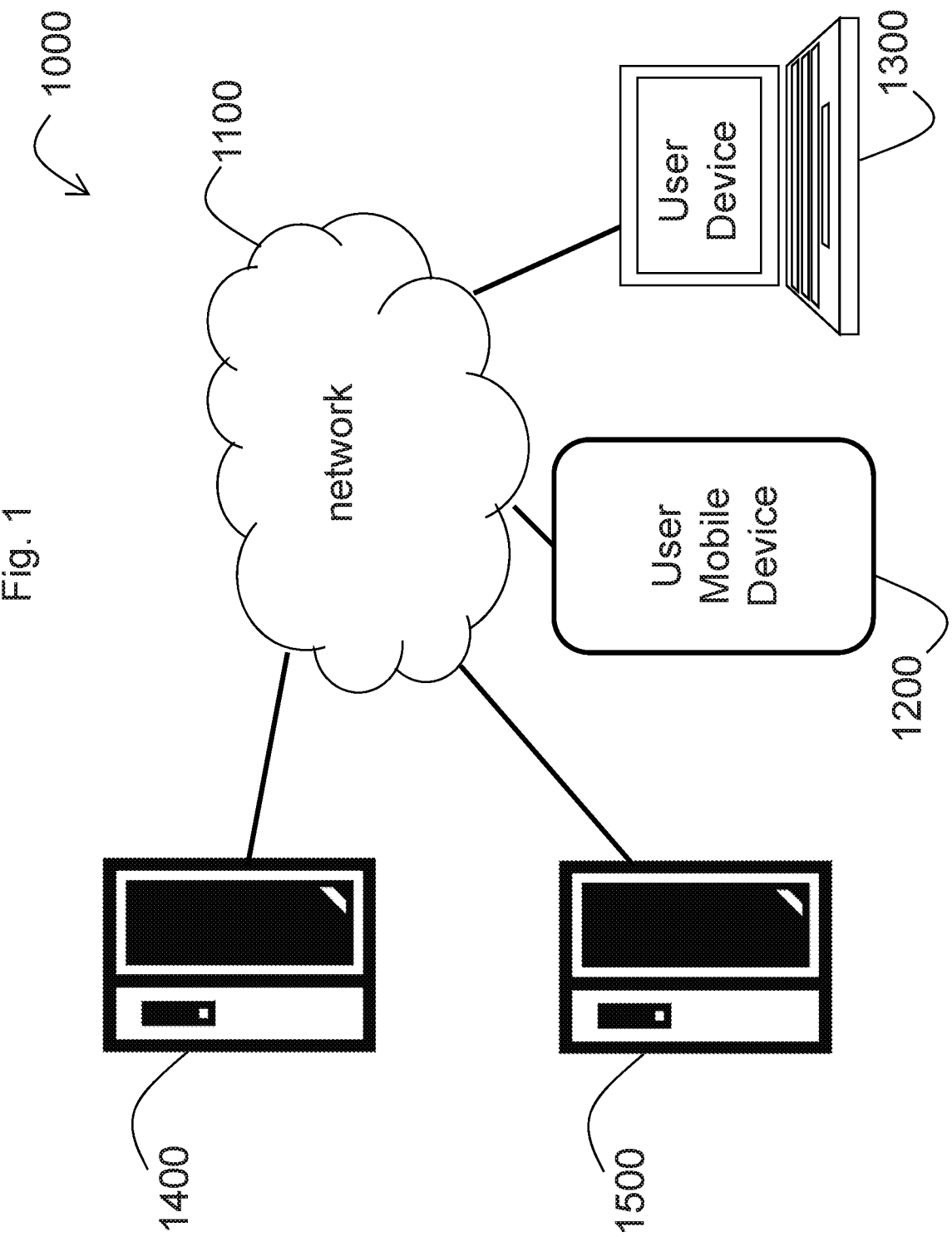
FIG. 1 is an exemplary illustration of a tax delinquency resolution and analysis system according to an embodiment of the present invention.

The present invention comprising systems and methods for tax compliance and delinquency resolution will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

The term "data points" or "data point" are variables that may affect computation of acceptable repayment schedule for a tax delinquency.

The above described drawing figures illustrate the described system and method of use in at least one of its preferred, best mode embodiment, which is further defined in detail in the following description. Those having ordinary skill in the art may be able to make alterations and modifications to what is described herein without departing from its spirit and scope. While the described invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated. Therefore, it should be understood that what is illustrated is set forth only for the purposes of example and should not be taken as a limitation on the scope of the present apparatus and its method of use.

Referring to FIG. 1, a tax delinquency resolution and analysis system 1000 according to an embodiment of the present invention is illustrated. The system 1000 generally includes a tax delinquency resolution and analysis server system 1400 that is configured to communicatively couple with a tax agency, e.g. Internal Revenue Service (IRS) and/or other tax authority, server system 1500. The analysis server system 1400 may be distributed on one or more physical servers, each having one or more processors, memory, an operating system, input/output interfaces, and one or more network interfaces all known in the art, and a plurality of end-user devices 1200, 1300 coupled through a communication network 1100, such as a public network (e.g., the Internet and/or a cellular-based wireless network) or a private network.

The end-user or client device include, for example, mobile device 1200 (e.g., phone, tablet, etc.), desktop or laptop device 1300, other devices with computing capability and network interfaces, and so on. The users of client device 1200, 1300 include taxpayers, professional tax services personnel (or practitioners), government personnel, and so on. As such, the terms taxpayers, professional tax services personnel, practitioners, and government personnel may be used interchangeably to denote the person using the software and system of the invention.

The tax server system 1500 includes, for example, federal and state systems that provide tax data points, codes, rules, procedures, etc.; and systems from other tax related authorities, such as courts, and so on.

Figure 2:
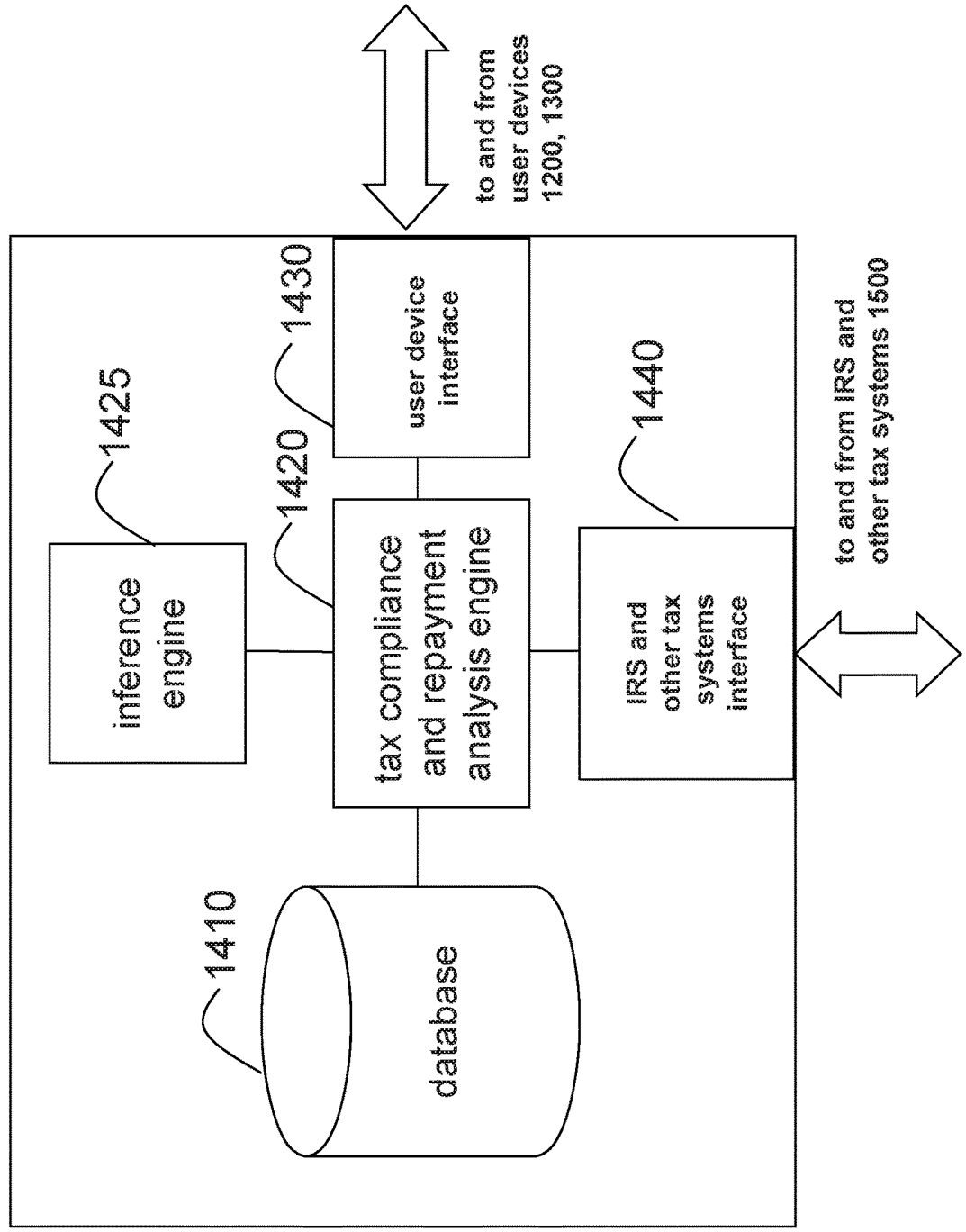
FIG. 2 is an exemplary illustration of a tax delinquency resolution and analysis server system according to an embodiment of the present invention.

Referring to FIG. 2, a diagram of a tax delinquency resolution and analysis server system 1400 according to an embodiment is illustrated. The analysis server system 1400 includes a user device interface 1430 implemented with technology known in the art for communication with user devices 1200, 1300. The system 1400 also includes an interface 1440 implemented with technology known in the art for communication with other computer server systems, e.g. tax server system 1500. As will be described in more detail below, the system 1400 further includes a tax compliance and repayment analysis engine 1420 that receives user inputs, interfaces with the tax system 1500 to mine tax data points, calculates, analyzes and provides tax compliance and repayment solutions, updates, and so on. The analysis engine 1420 is coupled to a user account database 1410 to store user and other information, as is described below. The database 1410 may be implemented with technology known in the art, such as relational database, object oriented database, distributed database, and so on. The engine 1420 is also coupled to an inference engine 1425 that uses inputted data, tax agency data, and other information, to infer further data, as will be described below. The analysis server system 1400 may also retrieve data from the tax system 1500 on a pre-determined periodic schedule, for example, for updates of IRS data points, tax codes, etc. The relevant data points may be extracted from textual data in webpages from the tax agency website, for example.

Figure 3:
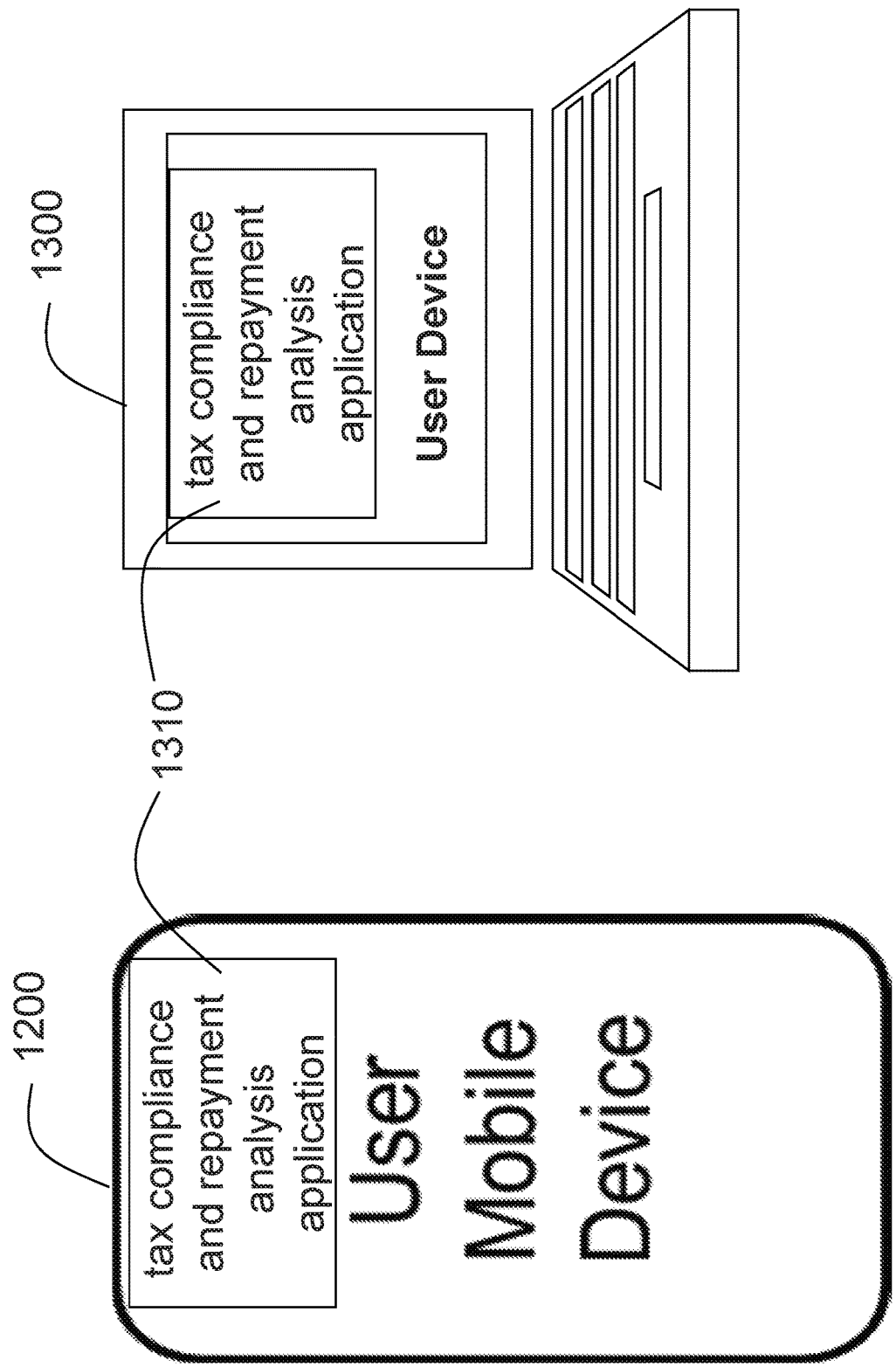
FIG. 3 is an exemplary diagram of user devices according to an embodiment of the present invention.

Referring to FIG. 3, a diagram of an end-user device 1200, 1300 according to an embodiment is illustrated. The end-user device 1200, 1300 includes a tax compliance and repayment analysis application 1310 that is installed in, pushed to, or downloaded to the user device 1200, 1300 from the system 1400. All tax updates, for example, data points, tax codes, and so on, received at the system 1400 may also be pushed to, or downloaded to the user device 1200, 1300, either automatically, or by subscription, or by new purchase or license. The application 1310 may operate as a stand-alone application or as a client of the analysis server system 1400. In one or more embodiments, the end-user device may operate as a thin client, thus relying on analysis server system 1400 for processing of the algorithms of the present invention. In an embodiment, when the application 1310 operates as a stand-alone application, it also includes the inference engine 1425. For convenience, when referred to below as application 1310 or application program 1310 or program 1310, it may apply to either as a full stand-alone or a client application, or to both.

In an embodiment, during the installation of the application 1310 in the user device 1200, 1300, the installation program will ask the user, for example, through a step-by-step wizard, to specify a location to install the application 1310 onto the user device 1200, 1300. The user may also specify how to access the installed application 1310. For example, on Windows computers, the installation program will allow a shortcut to be installed in the Programs menu, on the "Start" bar and/or the desktop. A series of additional help documents will also be installed with the application 1310 automatically. Once the application 1310 is installed, it may connect to the analysis server system 1400, via network 1100, to check for any updates necessary to ensure that the application 1310 is compliant with all of the latest tax codes related to the specific tax issues that the application 1310 is designed to resolve. If no update is found, the application 1310 will present a main home screen. If an update is found, the application 1310 will show an alert dialog, for example, "Please Wait", while it downloads the latest updates and saves the data to an embedded database within the application 1310 program. If the user device 1200, 1300 is not network-enabled, the application 1310 will update the software later when a network 1100 connection is established. When installed as a client application, the above updating step may not be needed.

The analysis server system 1400 is implemented using technology known in the art, such as built-in .NET/C# using Windows Presentation Foundation (WPF) for front end, and Compact SQL 4.0 for embedded database. The analysis server system 1400 may also be implemented as a cloud, cloud enterprise, client-server, software as a service (SaaS) architecture, and so on. The analysis server system 1400 may also display images, video or audio that will need external commercially available viewers such as Apple Computer's QuickTime media player, Microsoft's Windows media player, RealAudio's RealPlayer, and so on. Analysis server system 1400 web pages may be cached since much of the information does not change on a daily basis. This will aid greatly in scaling the analysis server system 1400 rapidly. The analysis server system 1400 may further be offered in different user versions, for example, individual taxpayer edition, independent contractor's edition, tax professional services edition (for accountants, attorneys, etc.), small business/employment tax edition, corporate edition for small to mid-size S-corporations, state editions, licensed edition (for the IRS, etc.), and so on. Those of skill in the art would appreciate that the analysis server system 1400 and the client device, e.g. 1200 or 1300, may be implemented in the same computer system.

Figure 4:
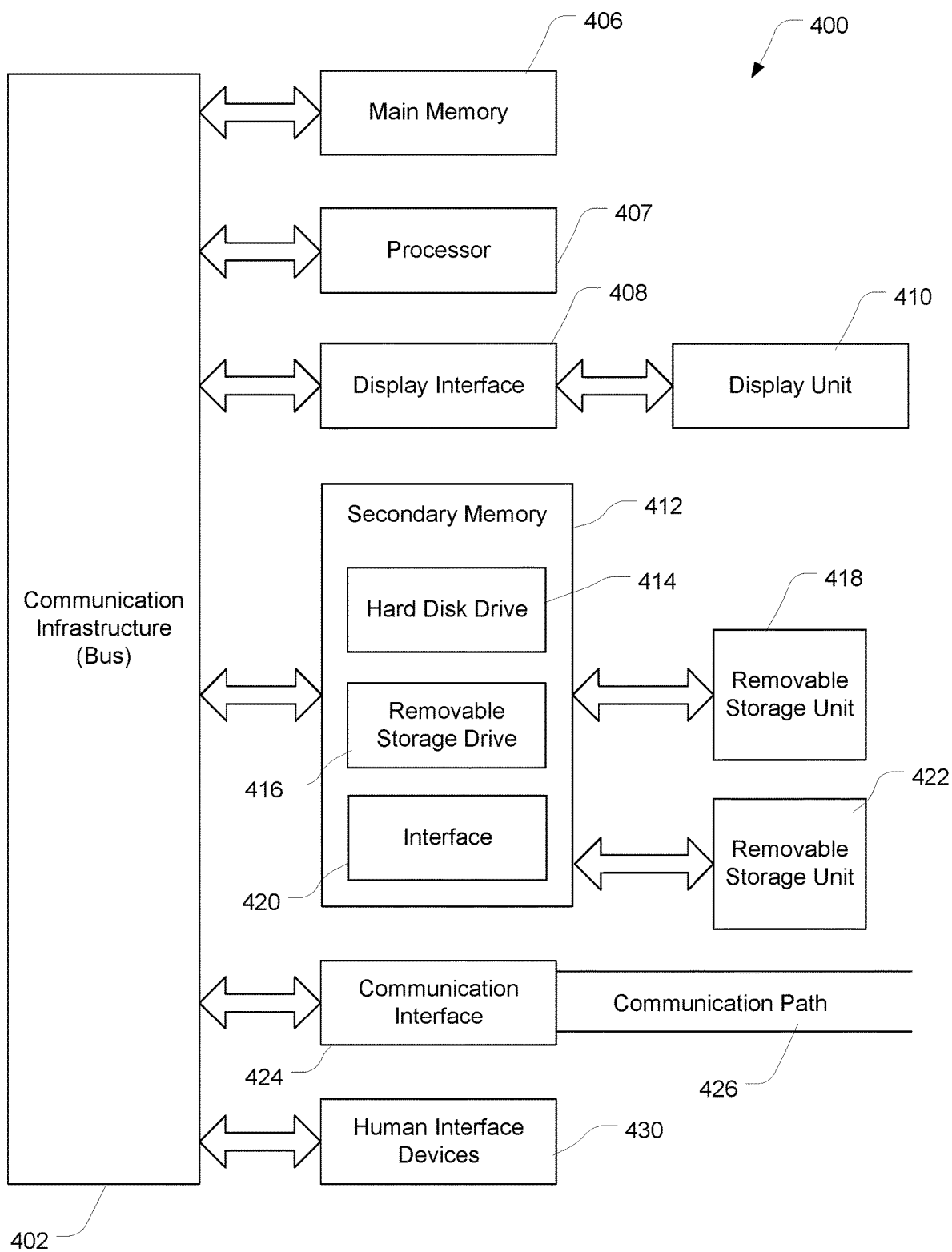
FIG. 4 illustrates a general-purpose computer and peripherals that when programmed as described herein may operate as a specially programmed computer capable of implementing one or more methods, apparatus and/or systems of the present invention.

FIG. 4 is an illustration of a computer system 400, when programmed as described herein, may operate as a specially programmed computer capable of implementing analysis server system 1400, user device 1200 and/or user device 1300. Processor 407 may be coupled to bi-directional communication infrastructure 402 such as communication infrastructure system bus 402. Communication infrastructure 402 may generally be a system bus that provides an interface to the other components in the general-purpose computer system such as processor 407, main memory 406, display interface 408, secondary memory 412 and/or communication interface 424.

Main memory 406 may provide a computer readable medium for accessing and executed stored data and applications. Display interface 408 may communicate with display unit 410 that may be utilized to display outputs to the user of the specially-programmed computer system. Display unit 410 may comprise one or more monitors that may visually depict aspects of the computer program to the user. Main memory 406 and display interface 408 may be coupled to communication infrastructure 402, which may serve as the interface point to secondary memory 412 and communication interface 424. Secondary memory 412 may provide additional memory resources beyond main memory 406, and may generally function as a storage location for computer programs to be executed by processor 407. Either fixed or removable computer-readable media may serve as secondary memory 412. Secondary memory 412 may comprise, for example, hard disk 414 and removable storage drive 416 that may have an associated removable storage unit 418. There may be multiple sources of secondary memory 412 and systems implementing the solutions described in this disclosure may be configured as needed to support the data storage requirements of the user and the methods described herein. Secondary memory 412 may also comprise interface 420 that serves as an interface point to additional storage such as removable storage unit 422. Numerous types of data storage devices may serve as repositories for data utilized by the specially programmed computer system. For example, magnetic, optical or magnetic-optical storage systems, or any other available mass storage technology that provides a repository for digital information may be used.

Communication interface 424 may be coupled to communication infrastructure 402 and may serve as a conduit for data destined for or received from communication path 426. A network interface card (NIC) is an example of the type of device that once coupled to communication infrastructure 402 may provide a mechanism for transporting data to communication path 426. Computer networks such Local Area Networks (LAN), Wide Area Networks (WAN), Wireless networks, optical networks, distributed networks, the Internet or any combination thereof are some examples of the type of communication paths that may be utilized by the specially programmed computer system. Communication path 426 may comprise any type of telecommunication network or interconnection fabric that can transport data to and from communication interface 424.

To facilitate user interaction with the specially programmed computer system, one or more human interface devices (HID) 430 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 407 to trigger one or more responses from the specially programmed computer are within the scope of the system disclosed herein.

While FIG. 4 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 4.

Figure 5:
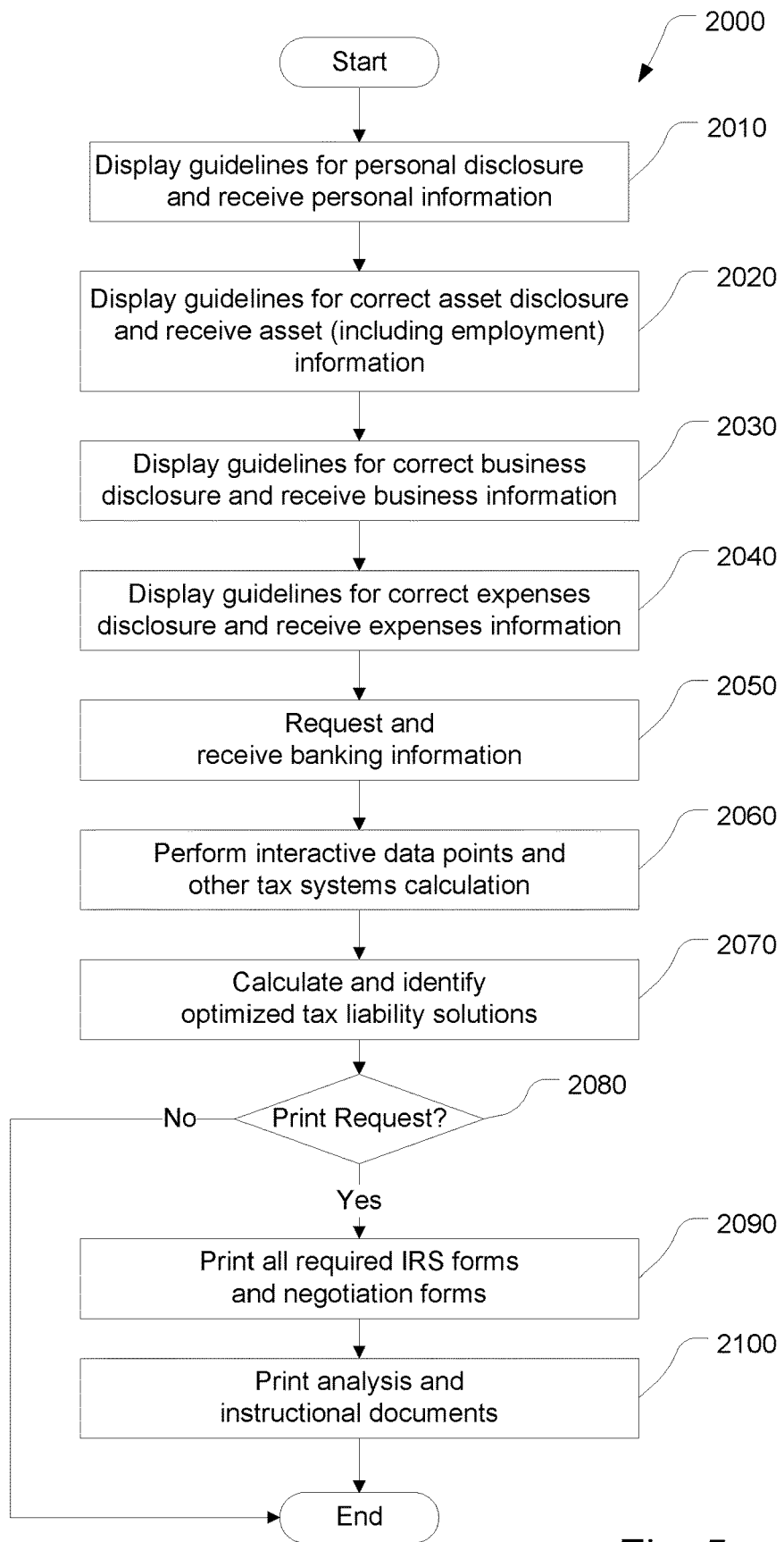
FIG. 5 is an illustration of a process for generating tax delinquency resolutions according to an embodiment of the present invention.
Figure 10:
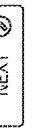
Figure 35:

Generally, the system 1000 comprises a process 2000, as illustrated in FIG. 5, that asks a user a series of questions related to the user's personal financial information, tax problems such as tax delinquencies, and provides solutions to resolve the tax problems. The user-entered content may be secured by a username and password to keep sensitive data from being discovered by another person using the same user device. In an embodiment, the user-entered content may be encrypted. The system will use the answers to these questions to calculate and determine the best solution to the user's tax problems. The system may also offer one or more further solutions to resolve the users' tax problems, as will be described below. The system also provides the taxpayer, who may be the same as the user, a "script sheet," with tax agency contact numbers to call or local tax offices to visit to implement their one or more tax solutions, and a script of what to say to, negotiate with, the agent of the tax authority on a telephone or in person, as to the analysis of why the taxpayer should be offered the one or more solutions listed on the script sheet.

Referring to FIG. 5, according to an embodiment, a process 2000 illustrating an operation of the system 1000 for acquiring taxpayer information (or financial circumstances) and generating proposed resolutions is illustrated. Each illustration presented in FIGS. 6 to 35 is an illustrative example of a user interface (UI) that provides guidelines, instructions, questions, and other information, that application 1310 may display to the user during this process. In an embodiment, the application 1310 displays guidelines and asks the user a series of questions. For example, in Block 2010, the user may be provided with one or more of the UIs illustrated in FIGS. 6 to 12 for their personal information; in Block 2020, the user may be provided with one or more of the UIs illustrated in FIGS. 13 to 18 for their asset information, including employment information (FIGS. 13 to 14); in Block 2030, the user may be provided with one or more of the UIs illustrated in FIGS. 19 to 22 for their business information; in Block 2040, the user may be provided with one or more of the UIs illustrated in FIGS. 23 to 28 for their expenses information, and in Block 2050, the user may be provided with one or more of the UIs illustrated in FIG. 34 for their banking information. Each question answered by the user may serve to determine what question the application 1310 will ask next. This may be implemented in a decision algorithm, e.g. an operational flowchart. Thus, information requested and provided in blocks 2010 to 2050 relate to the taxpayer's financial circumstances.

The decision algorithm of the system 1000 determines the next questions to ask, i.e. UIs to display, based on the user's responses to one or more prior questions. The decision algorithm may be implemented as part of the inference engine 1425. For example, when the user inputs a zip code, the system 1000 infers the city, state, etc., information. The system 1000 uses that data (and other inputted/inferred data) to extract data from the IRS website related to IRS "deals" the user may qualify for, e.g., under $25,000 owed, and to determine what documents are needed and what to display to the user. The system 1000 also uses the user's data to extract information from the IRS website related to rates, e.g., a maximum allowable living expense for the zip code. This feature permits the system 1000 to require less input from a user and speeds up the process.

The application 1310 may use texts, images, video, etc., when gathering the taxpayer information and when providing help to explain tax issues. The application 1310 may also provide one or more links, for example, hyperlinks, that when invoked by a user, will launch an external help window that will provide additional tax help. The application 1310 stores user-entered information in the embedded database and/or the account database 1410. The user-entered information may be added, updated, or deleted as often as the user feels necessary.

Once the application 1310 has gathered all the necessary information related to the taxpayer's financial circumstances or data (i.e. blocks 2010 to 2050), the analysis server system 1400 interacts with the tax system 1500 to retrieve the necessary data points at Block 2060. Using the data points, other tax codes, and algorithms, the tax system 1000 calculates and identifies one or more optimized solutions it determines to resolve the user's tax problems at Block 2070. In an embodiment, the application 1310 requires the user to answer all relevant questions before one or more solutions will be calculated. The solutions also resolve outstanding tax compliance issues, for example, liens, levies, garnishments, and so on. The solutions may include (not shown), but not limited to, Guaranteed Installment Agreement, Streamlined Installment Agreement, Financially Verified Installment Agreement, Direct Debit Installment Agreement, Partial Payment Installment Agreement, etc.

In one or more embodiments, to achieve greater chance of acceptance of a proposed resolution by the tax agency, a Deep Learning algorithm may be trained with documents of previously accepted tax resolutions by the tax agency. For example, the system 1000 may collect and save all previous submissions to the tax agency, e.g. IRS, that were previously acceptable as resolutions to differing tax delinquencies as training documents. The data could be collected by requiring users of the invention to indicate which of their submissions was accepted, for example. In addition, training documents may also include webpages from the IRS website for all the available programs to the taxpayer.

Thus, all documents supportive of a tax delinquency resolution constitute a positive training set. The documents that are not supportive may also be useful, however, because they generally identify a classification of documents that are unrelated to positive tax resolution. Such documents constitute a negative set of training documents. Consequently, a binary set of training documents is available. With such documents, the Deep Learning algorithm(s) in the system may be trained to make a binary choice, namely to score the current generated solutions. The solutions with high scores according to the Deep Learning algorithm(s), which are related to the positive training set, may be output and displayed to the user.

One object of amassing a sufficient number (hundreds if not thousands) of training documents is to train a deep learning algorithm so that it functions well, thus considered "strong." Consequently, category-specific training documents are passed to, and ingested by, one or more deep learning algorithms best suited to handle natural language processing (NLP). The algorithm more commonly used in the context of NLP and text analysis, is known to persons of skill in the art as a recurrent neural networks (RNN).

When a deep learning algorithm is trained to "understand" a particular type of tax delinquency case, it may be thought of as a "filter." Typically, the system will consist of more than one filter. The system passes the proposed solutions data through each filter to identify the optimized tax solution, i.e. at Block 2070.

After performing all calculations, application 1310 presents the one or more solutions to the user (e.g. FIGS. 29 to 33). The solutions may include a minimum payment solution based on a program offered by the tax agency, a payment solution based on the taxpayer's disposable income, etc. In an embodiment, the solutions may be presented in financial charts (not shown). In another embodiment, the application 1310 presents a Payment Plan Application form (or "Tandem Sheet") (FIG. 36). The Tandem Sheet presents at least one solution that has been deemed to be acceptable to the tax agency, e.g. by the deep learning algorithm. Once the user is presented with and accepts a certain solution, the user may elect (Block 2080) to print out the solution in the form of tax agency compliant documents, for example, IRS forms 433A, 433B and/or 433F, forms 9465 and 9465-FS, etc., at Block 2090, and also print out analysis and instructional documents for negotiating with the tax agency at block 2100.

The algorithms of the system 1000 include, but not limited to, algorithms to calculate the taxpayer's monthly income of the user, income tax, disposable income; to determine which forms the present to the taxpayer, and so on. These exemplary tax delinquency algorithms in accordance with one or more embodiments of the present invention are provided below.

The algorithm to calculate the monthly income:

```
public Decimal GetMonthlyIncome(TaxEntities.User user)
{
    var zero = 0.00m;
    if (null == user) { return zero; }
    var empRepo = new EmployerRepository( );
    var allWages = empRepo.GetAllByUser(user.UserId);
    var totalMonthlyIncome = zero;
    if (null == allWages || (allWages.Count ==
    1 && !allWages[0].IsCurrentlyEmployed)){
        return zero; //They don't have any money or are unemployed
    }
    foreach (var wageInfo in allWages)
    {
        var grossPay = DecimalChecker(wageInfo.GrossPay);
        var howOftenPaid = (wageInfo.HowOftenPaid.HasValue) ? wageInfo.HowOftenPaid.Value : Convert.ToByte(0);
        decimal monthlyGrossPay = zero;
        decimal grossM = zero;
        if (Convert.ToInt32(grossPay) > 0)
        {
            switch (howOftenPaid)
            {
                case 0: // "Weekly":
                    grossM = Convert.ToDecimal(grossPay * 4.30m);
                    monthlyGrossPay = decimal.Round(grossM, 2, MidpointRounding.AwayFromZero);
                    break;
                case 1: //"Bi-weekly":
                    grossM = Convert.ToDecimal(grossPay * 2.17m);
                    monthlyGrossPay = decimal.Round(grossM, 2, MidpointRounding.AwayFromZero);
                    break;
                case 2: // "Semi-Monthly":
                    grossM = Convert.ToDecimal(grossPay * 2.00m);
                    monthlyGrossPay = decimal.Round(grossM, 2, MidpointRounding.AwayFromZero);
                    break;
                case 3: // "Monthly":
                    monthlyGrossPay = grossPay;
                    break;
            }
        }
        totalMonthlyIncome += monthlyGrossPay;
    }
    return totalMonthlyIncome;
}
```

The algorithm to calculate income tax:
```
public Decimal CalculateIncomeTax(TaxEntities.User user, decimal whichTax=0.00 m, TaxEntities.EmployerInfo wageInfo=null)
{
    if (whichTax==0.00 m) {return whichTax;}
    if (null==wageInfo)
    {
        var empRepo=new EmployerRepository( );
        wageInfo=empRepo.GetByUserId(user.UserId);
    }
    var mTax=0.00 m;
    decimal monthlyTax=0.00 m;
    switch (wageInfo.HowOftenPaid.Value)
    {
        case 0://"Weekly":
            mTax=Convert.ToDecimal(whichTax*4.30 m);
            monthlyTax=decimal.Round(mTax, 2, MidpointRounding.AwayFromZero);
            break;
        case 1://"Bi-weekly":
            mTax=Convert.ToDecimal(whichTax*2.17 m);
```

```
        monthlyTax=decimal.Round(mTax, 2, Midpoin-
            tRounding.AwayFromZero);
        break;
    case 2:/"Semi-Monthly":
        mTax=Convert.ToDecimal(whichTax*2.0 m);
        monthlyTax=decimal.Round(mTax, 2, Midpoin-
            tRounding.AwayFromZero);
        break;
    case 3:/"Monthly":
        monthlyTax=whichTax;
        break;
    }
    return monthlyTax;
}
```
The algorithm to calculate disposable income:
```
public Decimal CalculateDisposableIncome( )
{
    var user=Globals.MainUser;
    var spouse=Globals.SpouseUser;
    var finalCalcs=new FinalCalculationo;
    var     amountOwedRepo=new     AmountOwed-
        Repository( );
    var    userOweTotal=amountOwedRepo.GetById(use-
        r.UserId);
    var fullAmountOwed=(null !=userOweTotal)
        ? ((userOweTotal. TotalAmount.HasValue) ?
userOweTotal.TotalAmount.Value.ToString("C"): zero)
        : zero;
    var mainIncome=finalCalcs.GetMonthlyIncome(user);
    var     spouseIncome=finalCalcs.GetMonthlyIncome
        (spouse);
    //Calculate Wages
    CalculateWageTaxes(finalCalcs);
    var nonWageRepo=new NonWageHouseholdIncom-
        eRepository( );
    var nonWages=nonWageRepo.GetById(user.UserId);
    var childSupport=Utility.GetDecimal(nonWages.Chil-
        dSupportIncome);
    var alimony=Utility.GetDecimal(nonWages.Alimony-
        Income);
    var rentalIncome=CalculateNetRentalIncome( );
    var     selfEmpIncome=Utility.GetDecimal(nonWages.
        NetSelfEmploymentIncome);
    var    unemployIncome=Utility.GetDecimal(nonWage-
        s.UnemploymentIncome);
    var     pensionIncome=Utility.GetDecimal(nonWag-
        es.PensionIncome);
    var   interest=Utility.GetDecimal(nonWages.InterestIn-
        come);
    var socSecIncome=Utility.GetDecimal(nonWages.So-
        cialSecurityIncome);
    var     otherIncome=Utility.GetDecimal(nonWages.O-
        ther);
    var empMoney=Decimal.Add(mainIncome, spouseIn-
        come);
    var moreM=Decimal.Add(empMoney, childSupport);
    var moreM2=Decimal.Add(moreM, alimony);
    var     moreM3=Decimal.Add(moreM2,     unemployIn-
        come);
    var moreM4=Decimal.Add(moreM3, pensionIncome);
    var moreM5=Decimal.Add(moreM4, socSecIncome);
    var moreM6=Decimal.Add(moreM5, interest);
    var moreM7=Decimal.Add(moreM6, rentalIncome);
    var    moreM8=Decimal.Add(moreM7,    selfEmpIn-
        come);
    var    endingTotal=Decimal.Add(moreM8,    otherIn-
        come);
    CalculateExpenses(finalCalcs);
    var         totalClaimedExpenses=GetExpense-
        Totals( ).Item2;//Really Claimed Expenses
    var disposableIncome=endingTotal—totalClaimedEx-
        penses;
    hasIncomeBeenSet=true;
    isIncomeHigher=(disposableIncome>0.00 m);
    return disposableIncome;
}
```

```
private void CalculateExpenses(FinalCalculation finalCalcs)
{
    var foodActualAllowed = finalCalcs.
    GetTotalAllowableFoodPersonalCare( );
    //Now add to totals
    AddToExpenseTotals(foodActualAllowed.Actual,
    foodActualAllowed.MaxAllowable,
                foodActualAllowed.MaxAllowable, true);
    TaxEntities.MonthlyLivingExpenses expenses = new
MonthlyLivingExpensesRepository( ).
GetById(Globals.MainUser.UserId);
    var rentorMortgage = finalCalcs.GetRentOrRealEstatePayment( );
    var userHousingTotal = rentorMortgage
                + Utility.GetDecimal
                  (expenses.ElectricOilGasWaterTrash)
                + Utility.GetDecimal
                  (expenses.TelephoneAndOrCellPhone)
                + Utility.GetDecimal
                  (expenses.MaintenanceAndRepairs)
                + Utility.GetDecimal(expenses.RealEstateTaxes);
    var userHousingMaxAllowable =
    finalCalcs.GetUtilitiesNumbers( );
    var claimedHousingTotal = (userHousingTotal >
    userHousingMaxAllowable.MaxAllowable)
                    ? userHousingMaxAllowable.MaxAllowable
                    : userHousingTotal;
    //Now add to totals
    AddToExpenseTotals(userHousingTotal, claimedHousingTotal,
userHousingMaxAllowable.MaxAllowable);
    var vehicleInfo = finalCalcs.GetVehicleNumbers( );
    var firstVehicle = vehicleInfo.Item1;
    //Now add to totals
    AddToExpenseTotals(firstVehicle.Actual,
firstVehicle.GetClaimedAmount( ), firstVehicle.MaxAllowable);
    var secondVehicle = vehicleInfo.Item2;
    //Now add to totals
    AddToExpenseTotals(secondVehicle.Actual,
secondVehicle.GetClaimedAmount( ),secondVehicle.MaxAllowable);
    var operatingExpensesVehicle = vehicleInfo.Item3;
    //Now add to totals
    AddToExpenseTotals(operatingExpensesVehicle.Actual,
operatingExpensesVehicle.GetClaimedAmount( ),
operatingExpensesVehicle.MaxAllowable);
    var wageInfo = finalCalcs.GetEmployerInfo
    (Globals.MainUser.UserId);
    var spouse = Globals.SpouseUser;
    var spouseWageInfo = (null != spouse) ?
finalCalcs.GetEmployerInfo(spouse.UserId) : null;
    var dZero = 0.00m;
    if ((null == wageInfo || (wageInfo.Count ==
    1 && !wageInfo[0].IsCurrentlyEmployed))
        && spouseWageInfo == null || (null !=
        spouseWageInfo && spouseWageInfo.Count == 1
    && !spouseWageInfo[0].IsCurrentlyEmployed))
    {
        //Do Nothing
    }
    else
    {
        CalculateWageTaxes(finalCalcs);
    }
    var healthInsurance =
    Utility.GetDecimal(expenses.HealthInsurance);
    //Now add to totals
    AddToExpenseTotals(healthInsurance,
    healthInsurance, healthInsurance);
    var nums = finalCalcs.GetOutOfPocketMedicalCostNumbers( );
    //Add Out of Pocket
```

```
    AddToExpenseTotals(nums.Actual,
    nums.GetClaimedAmount( ), nums.MaxAllowable);
    var wholeLife = dZero;
    try
    {
        var otherAssets = new OtherAssetsRepository( ).
        GetAll( ).Where(cv => !cv.IsVehicle);
        foreach (var asset in otherAssets)
        {
            if (asset.Description.HasValue &&
            asset.Description.Value == Convert.ToByte(4))
            {
                wholeLife += (asset.MonthlyPayments.HasValue) ?
asset.MonthlyPayments.Value : 0.00m;
            }
        }
    }
    catch (Exception ez)
    {
    }
    var termLife = Utility.GetDecimal(expenses.TermLifeInsurance);
    //Now add to totals
    AddToExpenseTotals(termLife, termLife, termLife);
    //Now add to totals
    AddToExpenseTotals(wholeLife, wholeLife, wholeLife);
    //Union Dues
    //var totalProfitLoss = Utility.GetDecimal(expenses.UnionDues);
    //Now add to totals
    //AddToExpenseTotals(totalProfitLoss,
    totalProfitLoss, totalProfitLoss);
    //Estimated Tax Payments
    var estimatedTaxPayment =
    Utility.GetDecimal(expenses.EstimatedTaxPayments);
    //Now add to totals
    AddToExpenseTotals(estimatedTaxPayment,
    estimatedTaxPayment, estimatedTaxPayment);
    var childcare = Utility.GetDecimal
    (expenses.ChildDependentCare);
    //Now add to totals
    AddToExpenseTotals(childcare, childcare, childcare);
    var studentLoans = Utility.GetDecimal(expenses.StudentLoans);
    //Now add to totals
    AddToExpenseTotals(studentLoans, studentLoans, studentLoans);
    var courtOrdered = Utility.GetDecimal
    (expenses.CourtOrderedPayments);
    //Now add to totals
    AddToExpenseTotals(courtOrdered, courtOrdered, courtOrdered);
    var retirement = Utility.GetDecimal
    (expenses.RetirementEmployment);
    //Now add to totals
    AddToExpenseTotals(retirement, retirement, retirement);
    var retirementVoluntary = Utility.
    GetDecimal(expenses.RetirementVoluntary);
    //Now add to totals
    AddToExpenseTotals(retirementVoluntary,
    retirementVoluntary, retirementVoluntary);
    var cc = new CreditCardRepository( );
    var allCreditCards = cc.GetAllItems( );
    var ccTotal = 0m;
    if (null != allCreditCards && allCreditCards.Count > 0)
    {
        foreach (var item in allCreditCards)
        {
            ccTotal += Utility.GetDecimal
            (item.MinimumMonthlyPayment);
        }
    }
    //Now add to totals
    AddToExpenseTotals(ccTotal, dZero, dZero);
    var totalsForExpenses = GetExpenseTotals( );
}
private decimal actualExpenseTotal = 0m;
private decimal claimedExpenseTotal = 0m;
private decimal maxAllowedExpenseTotal = 0m;
private void AddToExpenseTotals(decimal actual,
decimal claimed, decimal maxAllowed, bool isStart = false)
{
    if (isStart)
    {
        actualExpenseTotal = 0.00m;
        claimedExpenseTotal = 0.00m;
        maxAllowedExpenseTotal = 0.00m;
    }
    var newActual = Decimal.Add(actualExpenseTotal, actual);
    var newClaimed = Decimal.Add(claimedExpenseTotal, claimed);
    var newMax = Decimal.Add
    (maxAllowedExpenseTotal, maxAllowed);
    actualExpenseTotal = newActual;
    claimedExpenseTotal = newClaimed;
    maxAllowedExpenseTotal = newMax;
}
public Decimal CalculateMonthlyPaymentOrDisposable( )
{
    var monthlyPaymentAmount = 0.00m;
    decimal amountOwedInTotal = this.GetTotalAmountOwed( );
    var TEN_K = 10000m;
    var hasAccountNumbers =
    Globals.HasFilledBankAccountNumbers( );
    if (!hasAccountNumbers ||
    !Globals.IsFullPay(amountOwedInTotal))
    {
        monthlyPaymentAmount = this.CalculateDisposableIncome( );
    }
    else
    {
        var howManyMonths = (amountOwedInTotal <= 10000m &&
Globals.IsInCompliance(amountOwedInTotal)) ? 36m : 72m;
        monthlyPaymentAmount =
        amountOwedInTotal / howManyMonths;
    }
    return monthlyPaymentAmount;
}
public Decimal CalculateMonthlyPayment
(decimal totalAmountOwed = 0.00m)
{
    var monthlyPaymentAmount = 0.00m;
    decimal amountOwedInTotal = totalAmountOwed;
    if (amountOwedInTotal == 0.00m)
    {
        amountOwedInTotal = this.GetTotalAmountOwed( );
    }
    var disposableCalc = new DisposableIncome( );
    var howManyMonths = (amountOwedInTotal < 10000m &&
Globals.IsInCompliance(amountOwedInTotal)) ? 36m : 72m;
    monthlyPaymentAmount =
    amountOwedInTotal / howManyMonths;
    return monthlyPaymentAmount;
}
```

The algorithm to determine which forms to present to the taxpayer/user:

```
var disposable=new DisposableIncome( );
if (!disposable.IncomeIsHigher)//Currently Not Collect-
    able
{
    form_install_agreemnt_9465.Visibility=
        System.Windows.Visibility.Collapsed;
    form_install_agreemnt_9465FS.Visibility=
        System.Windows.Visibility.Collapsed;
    this.isCnc=true;
}
else
{
    //Do we show 9465 or 9465FS?
    var     disposableIncome=disposable.Calculate-
        DisposableIncome( );
    var     owedRepo=new     AmountOwedRepository( ).
        GetAll(             ).Single(a=>a.UserId==Globals.
        MainUser.UserId);
    var     totalAmountOwed=owedRepo.TotalAmount.
        Value;
    var TWENTY_FIVE_K=25000 m;
    var FIFTY_K=50000 m;
```

```
if (totalAmountOwed<=TWENTY_FIVE_K)
{
  //Show form 433F only if user can't pay over 72
    months
  if (Globals.MainUser.CanPayOver72Months)
  {
    form_433.Visibility=System.Windows.
      Visibility.Collapsed;
  }
  else
  {
    form_433.Visibility=System.Windows.
      Visibility.Visible;
  }
  //Show form 9465
  form_install_agreemnt_9465.Visibility=
    System.Windows.Visibility.Visible;
  form_install_agreemnt_9465FS.Visibility=
    System.Windows.Visibility.Collapsed;
  //Show Tandem
  form_tandem.Visibility=System.Windows.
    Visibility.Visible;
}
else if (totalAmountOwed>TWENTY_FIVE_K &&
  totalAmountOwed<=FIFTY_K)
{
//Partial Payment or user elects to pay in 72 months
if       ((disposableIncome>=(totalAmountOwed/72
  m))||Globals.MainUser.CanPayOver72Months)
{
  //Don't          show           form
    433F----------------------------------
  form_433.Visibility=System.Windows.
    Visibility.Collapsed;
  //Show tandem
  form_tandem.Visibility=System.Windows.
    Visibility.Visible;
  //Show    9465-FS    Page    1    and
    2--------------------------------
  form_install_agreemnt_9465.Visibility=System.
    Windows.Visibility.Collapsed;
  form_install_agreemnt_9465FS.Visibility=
    System.Windows.Visibility.Visible;
}
else
{
  //Show                                    Form
    433F-----------------------------------------
  form_433.Visibility=System.Windows.
    Visibility.Visible;
  //NO   TANDEM   EITHER—Phil's   proprietary
    sheet----------------------
  form_tandem.Visibility=System.Windows.
    Visibility.Collapsed;
  //Show      9465-FS      Just      Page
    1-------------------------------------
  form_install_agreemnt_9465.Visibility=
    System.Windows.Visibility.Collapsed;
  form_install_agreemnt_9465FS.Visibility=
    System.Windows.Visibility.Visible;
}
}
else if (totalAmountOwed>FIFTY_K)
{
  //Show Form 433f
  form_433.Visibility=System.Windows.Visibility.
    Collapsed;
  //Show 9465
  form_install_agreemnt_9465.Visibility=System.
    Windows.Visibility.Visible;
  form_install_agreemnt_9465FS.Visibility=System.
    Windows.Visibility.Collapsed;
  //Show Tandem
  form_tandem.Visibility=System.Windows.
    Visibility.Visible;
}
}
```

As illustrated in FIGS. 1-3, system 1000 comprises a plurality of systems and software components/modules. Modules may be logical entities (e.g., software programs, software applications, software subsystems), database subsystems, etc. For ease of understanding, the software application and programs are described herein in terms of modules and related sub-modules. Thus, the information received from the user, the calculations performed by the system, and the forms for which the received and calculated information will be printed are all described herein in terms of modules. However, it should be apparent to those of skill in the art that the software programs need not be implemented as separate modules. Also, the following examples use the IRS as the tax agency for ease of understanding of an exemplary embodiment only. The concepts described herein may be equally applicable to other tax agencies with slight modification.

Database Module: In one or more embodiments of the present invention, database 1410 comprises information, provided in one or more modules as described in more detail below, from the taxpayer and information which maybe manually or automatically generated based upon information from IRS's database/website. This database may also be updated when the tax agency, e.g. IRS, updates or changes the allowable expenses. For example, there are currently in excess of 144,000 data points on the IRS's website that affect tax delinquency and repayment calculations. These data points are more efficiently obtained by mining webpages on the IRS website. Similarly, data points for other tax agencies may be obtained by mining webpages on their respective websites.

The data points for allowable expenses include, but are not limited to, the following: food, household supplies, clothing and clothing services, personal care products and services, miscellaneous expenses, rent, electric, oil/gas, water/trash/telephone/cell/cable/internet, real estate taxes, insurance, maintenance and repairs, transportation costs (lease or loan payments, gas/insurance, licenses, parking/maintenance and public transportation), medical expenses based upon the number and age of the taxpayers, including their dependents, and so on. Each county has its own allowable expenses that are adjusted for the number of individuals living in the household. Thus, for example, a one-person's household expenses would be less than a family of four. The IRS, for example, has also allowed increases in transportation costs that are based on Metropolitan Statistical Areas (MSA). For example, there are currently about 23 such areas which include the following: National, Northeast, Boston, New York, Philadelphia, Midwest, Chicago, Cleveland, Detroit, Minneapolis-St. Paul, South Atlanta, Baltimore, Dallas-Ft. Worth, Houston, Miami, Washington, D.C., West Los Angeles, Phoenix, San Diego, San Francisco, Seattle, and so on. The database may also incorporate any special programs by the IRS with respect to installment agreements.

Personal Information Module: The data entry (see FIGS. 6-12) in this module may be inputted via various sub-Modules. Typical sub-modules consist of the following:

1. Personal Profile (FIG. 6): Data inputted might include information such as: taxpayer's name, email address, social security number, home and cell phone numbers.
2. Dependent Module (FIG. 7): Data inputted might include information such as: the number of live-in dependents claimed by the user.
3. Taxes Owed (FIG. 8): Data inputted might include information such as: the taxpayer's debt by calendar year. This module may also contain inquiries as to any tax levies against a bank account or a garnishment of wages that are currently in effect with respect to the taxpayer(s). The program also requests the taxpayer to disclose whether there is a bank levy or garnishment of wages due to a levy by the tax agency. Finally, the program requests the taxpayer to disclose whether the taxpayer has received an eviction notice or utility shut-off notice. If there is a levy and either the taxpayer has an eviction notice or a utility shut-off notice, the program will advise the tax practitioner that the levy may be lifted by disclosing these item to the tax agency.
4. Compliance Status (FIG. 9): In order to get an installment agreement the tax agency may require that the taxpayer be in compliance from a tax standpoint.
   a. Currently to be in compliance, the IRS, for example, requires that the taxpayer has filed all of his, her or their tax returns. If the taxpayer is in bankruptcy, an installment agreement may not be available until the bankruptcy is terminated. If the taxpayer is in audit, the year in audit will not be included in the installment payment agreement and upon conclusion of the audit, the installment agreement may be amended to add that year, along with any amounts that are ultimately owed.
   b. For the IRS, for example, if the total amount owed is under $10,000, the taxpayer has to disclose whether the IRS has already accepted an Offer in Compromise and whether the taxpayer has filed the last 5 years timely, paid all taxes and has no other installment agreements outstanding. This Module is configured to inform the tax user that the taxpayer may be eligible for a guaranteed installment agreement providing the amount owed is under $10,000, all tax returns and taxes for the prior 5 years were filed and paid timely, there are no Offers in Compromises that have been accepted and that there are no other installment agreements outstanding.
5. Marital Status (FIGS. 10-11): If the individual taxpayer is single, no further information will be inputted. If the taxpayer is married, the program requests the spouse's information such as the name, social security or Tax Identification Number (TIN) number, date of birth, home and cell phone numbers.
6. Address (FIG. 12): The taxpayer inputs his or her address, including the zip code. In one or more embodiments, when the user enters the zip code, the system automatically fills in the City, County and State. The taxpayer has to disclose whether the taxpayer owns the residence or rents the residence.

Employment, Real Estate and Personal Assets Module. This Module may be described in terms of the following 5 sub-modules (see FIGS. 13-18).

Figure 14:
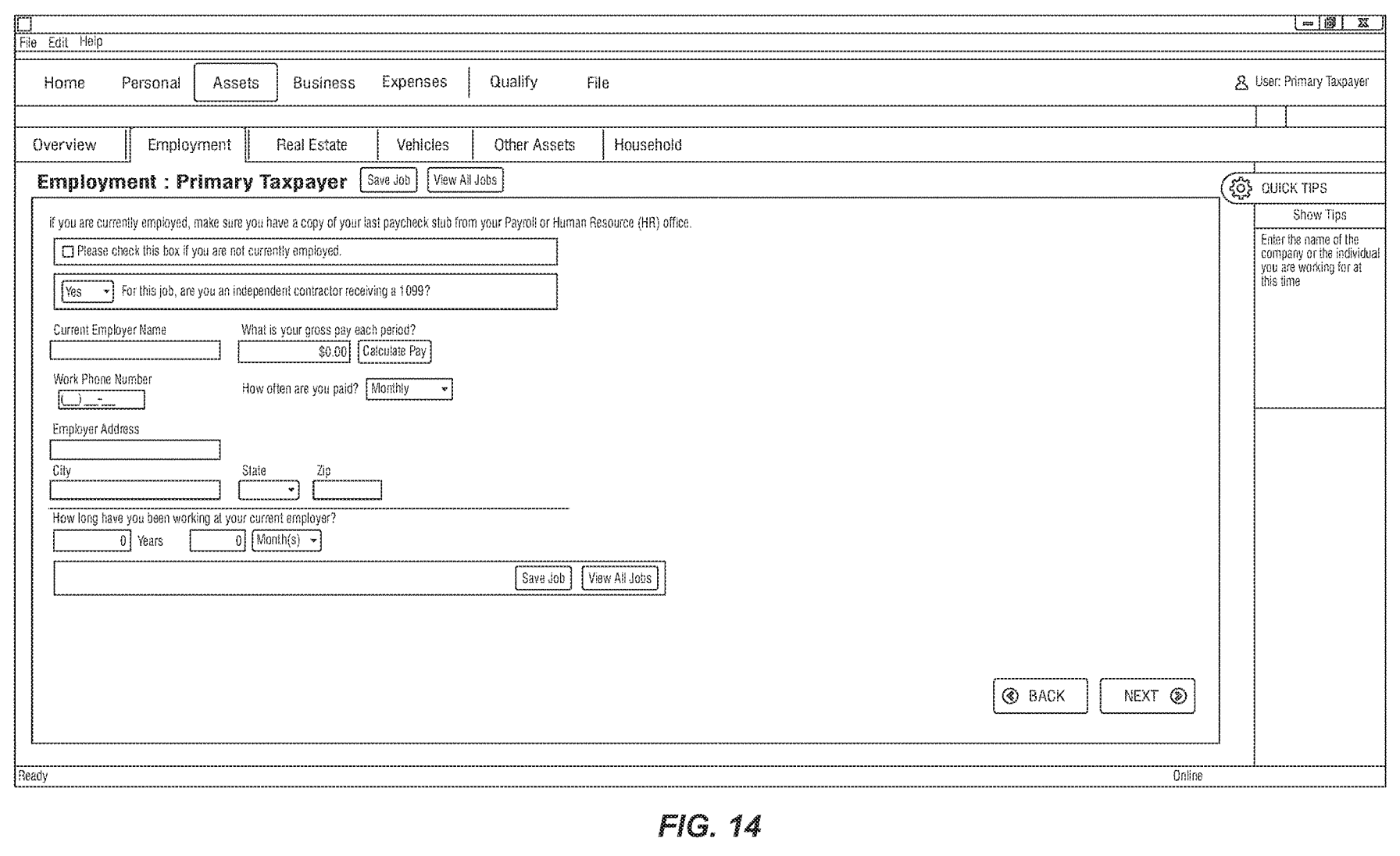
Figure 15:
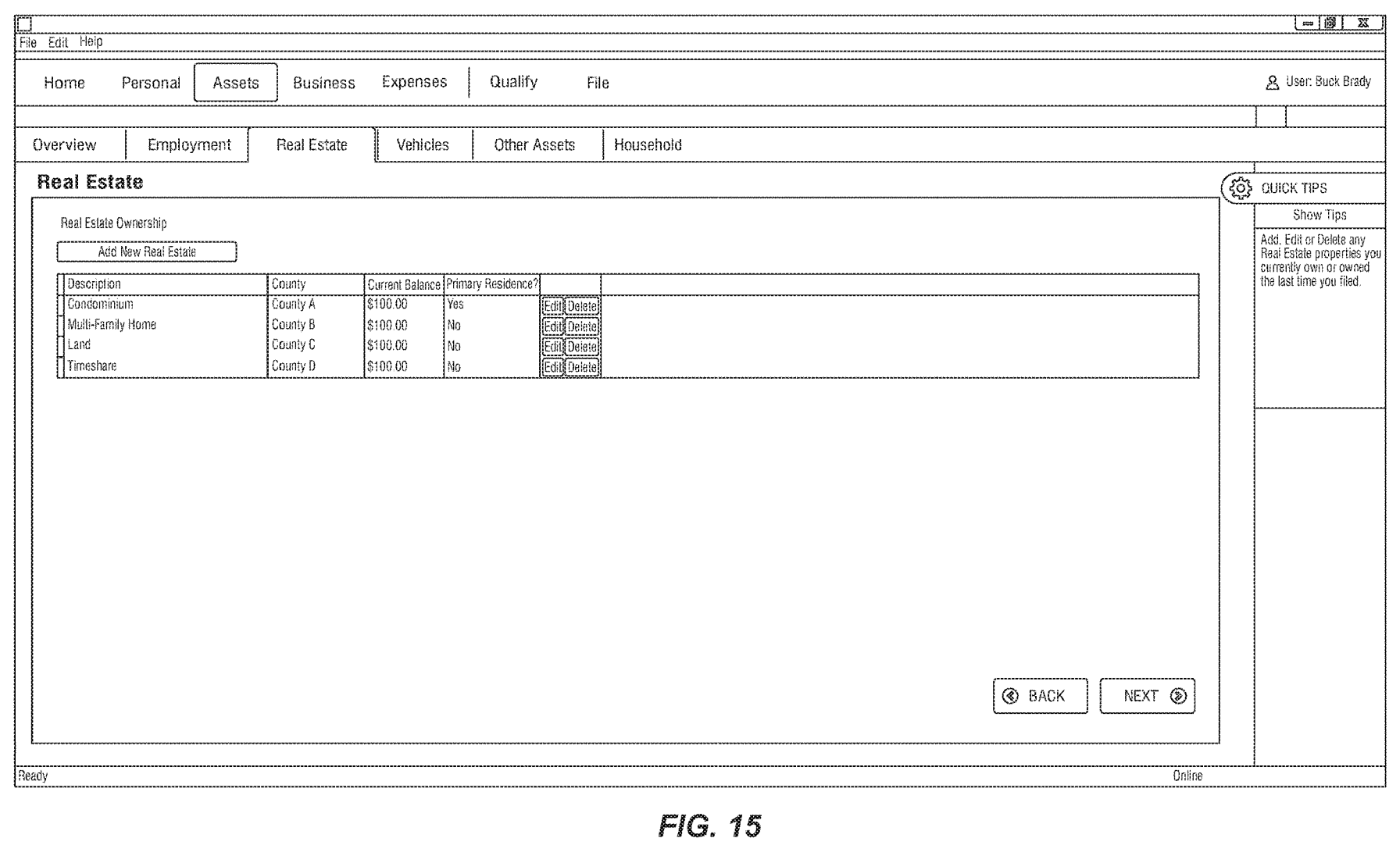
Figure 16:
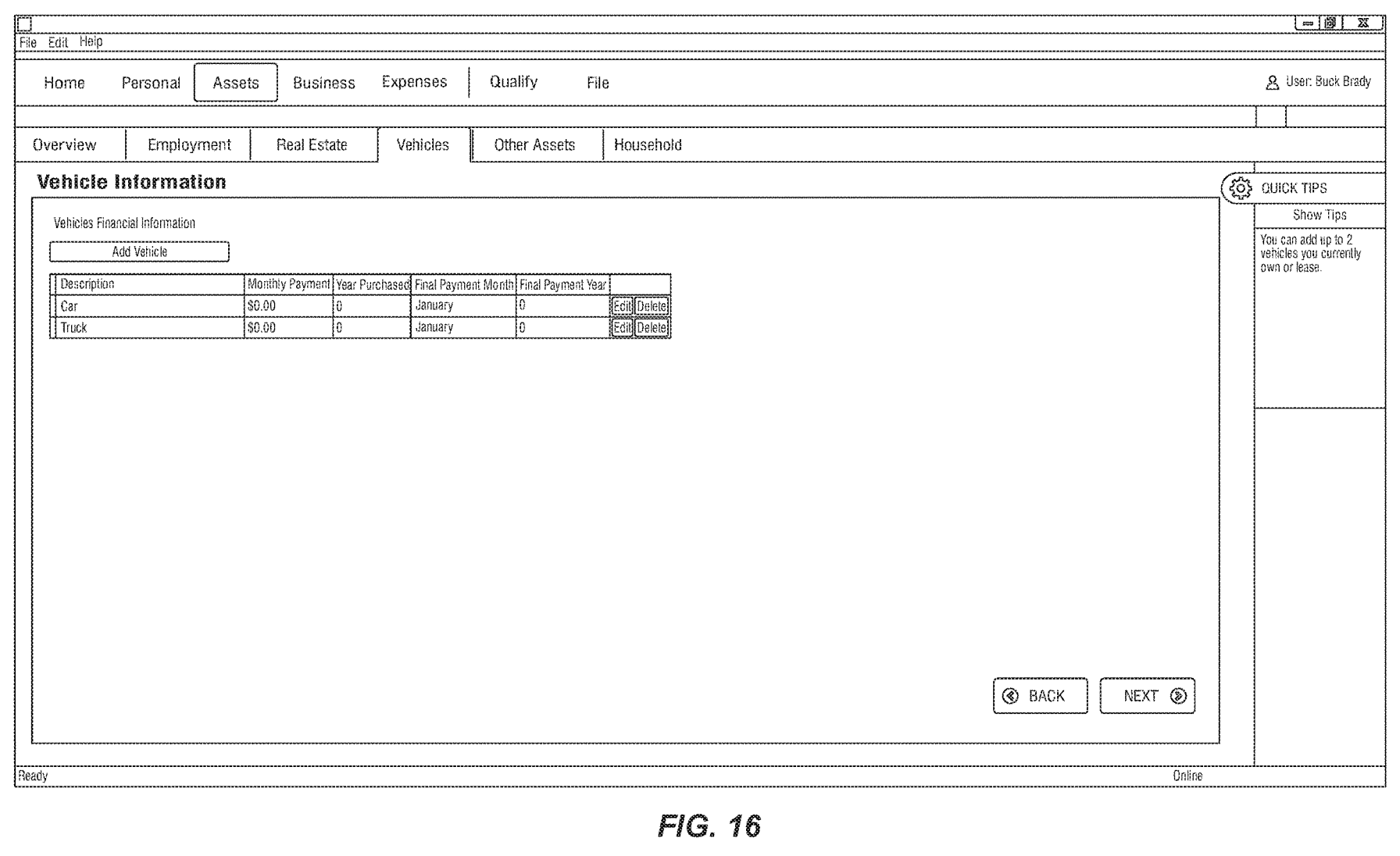
Figure 17:
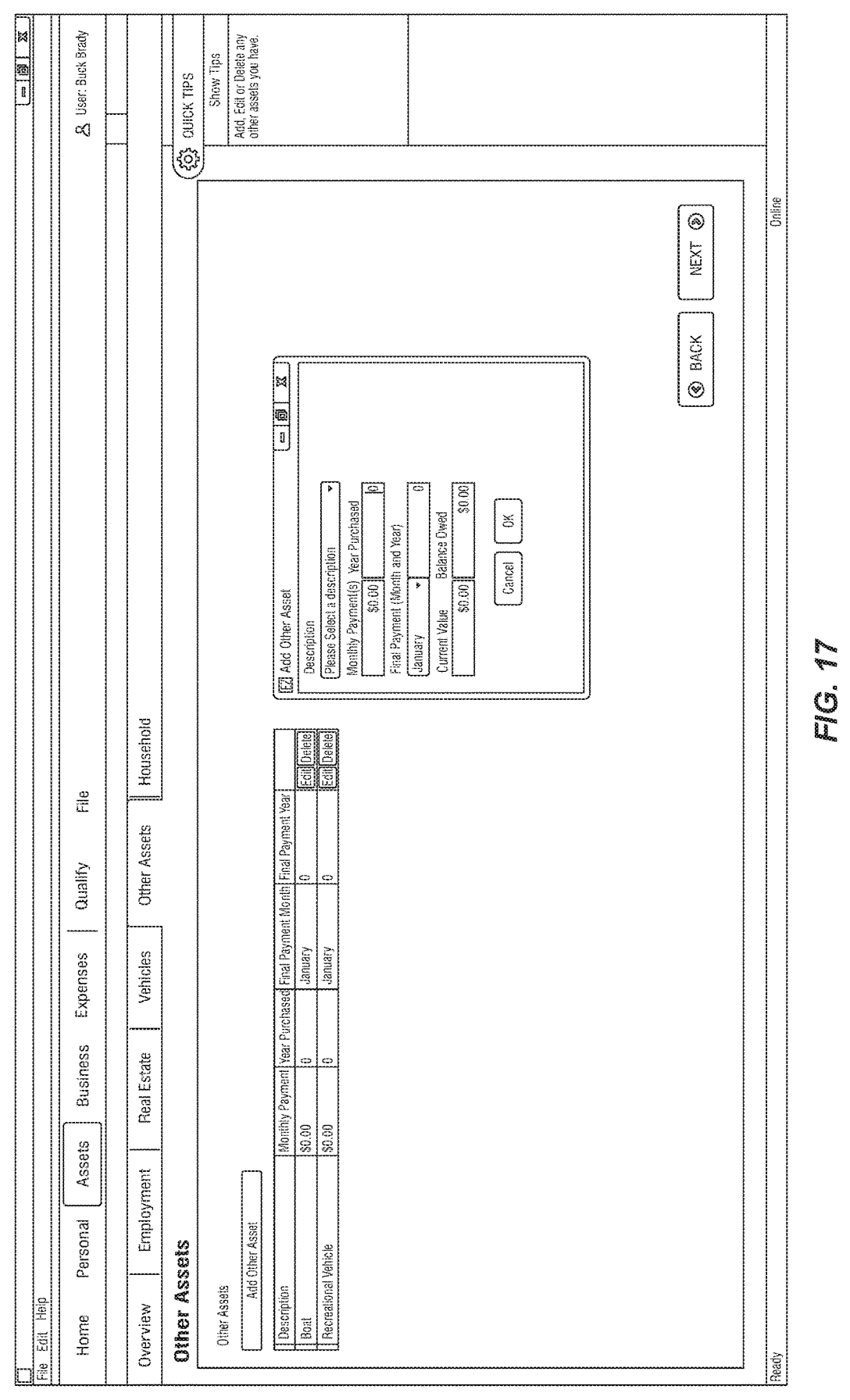

1. Employment (FIGS. 13-14). This module requests the wage information of the taxpayer. The taxpayer (or user) has to indicate whether the taxpayer is employed and if so, as an employee or independent contractor. The practitioner (or user) also needs to fill in the employer's name, address, phone number, the times they receive payment (such as weekly, semi-monthly and any withholdings). There is also a sub-module, if appropriate for the spouse.
2. Real Estate (FIG. 15). This module collects the data on any real estate owned including where the property is located, the date it was acquired, the value and the outstanding balance as well as whether the property has ever been refinanced. The real estate includes residential property, investment property and rental property. On the rental properties, the program requests all income and expenses related to the rental, including insurance, management fees, cleaning, maintenance, repairs, property taxes, legal fees, administrative fees, and so on. There is a tab that allows the taxpayer to choose among the following: Single Family residence (SFR), vacation property, timeshare, multi-family home, duplex, condominium, townhome, apartment, mobile home, motorhome, land, and so on.
3. Vehicles (FIG. 16). This is where the practitioner (or user) would enter all the information regarding vehicles owned by the taxpayer. For each vehicle the taxpayer would have to choose either a car, truck or motorcycled. The information would also contain the date of purchase, the current value, the outstanding loan and the monthly payment as well as when the last payment date would occur, and so on. The IRS, for example, only allows 2 vehicles per family (only 1 if single) and any other vehicles would have to be listed under other assets.
4. Other assets (FIG. 17). This would include any vehicle beyond those vehicles listed above and would include a car, boat, recreational vehicle, whole life policy, truck, motorcycle, and so on.
5. Other Income (FIG. 18). This sub-module receives information provided by the taxpayer on alimony income, child support income, net self-employment income, interest income, unemployment income, pension income, social security income, and other income.

Figure 21:
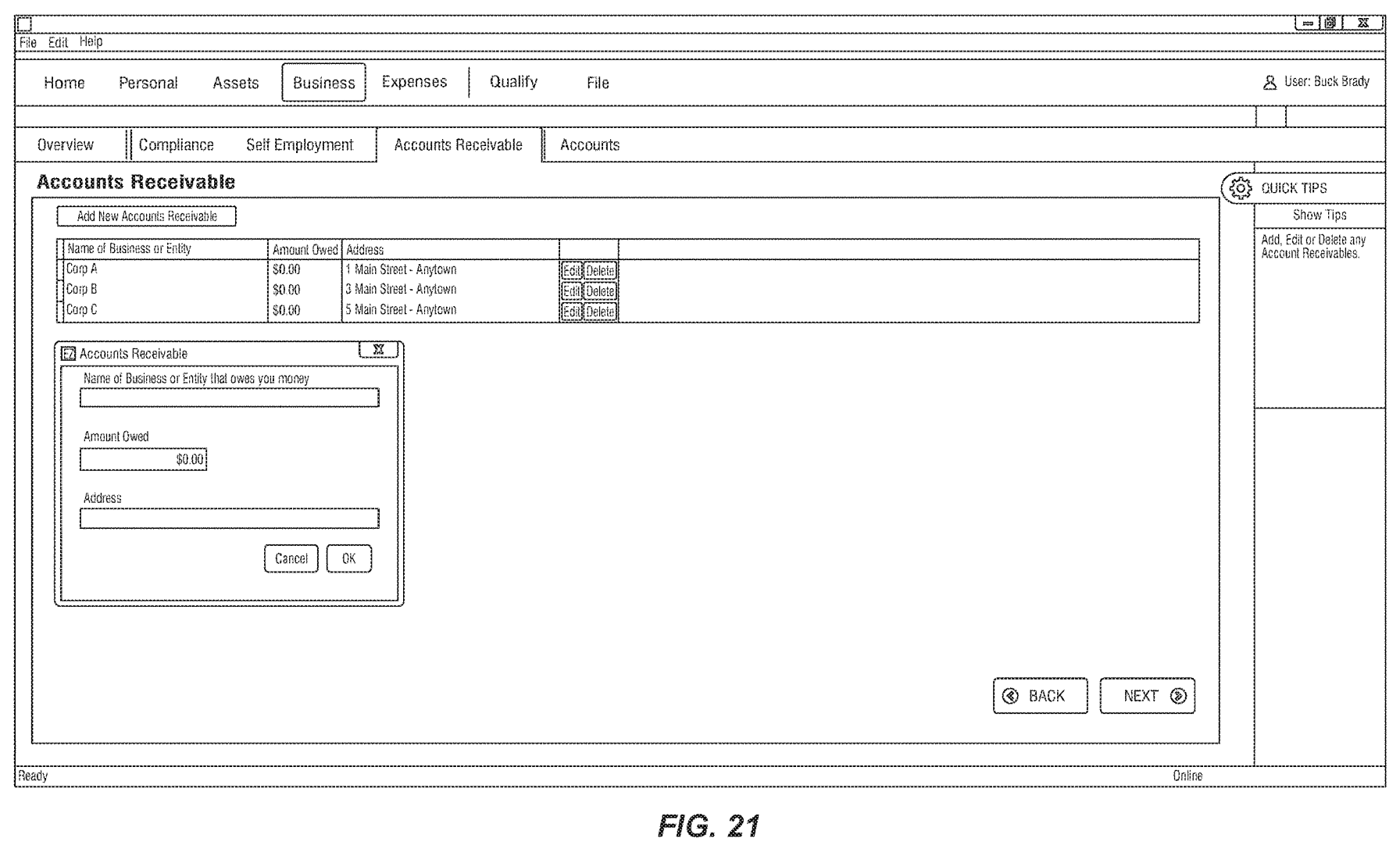
Figure 22:
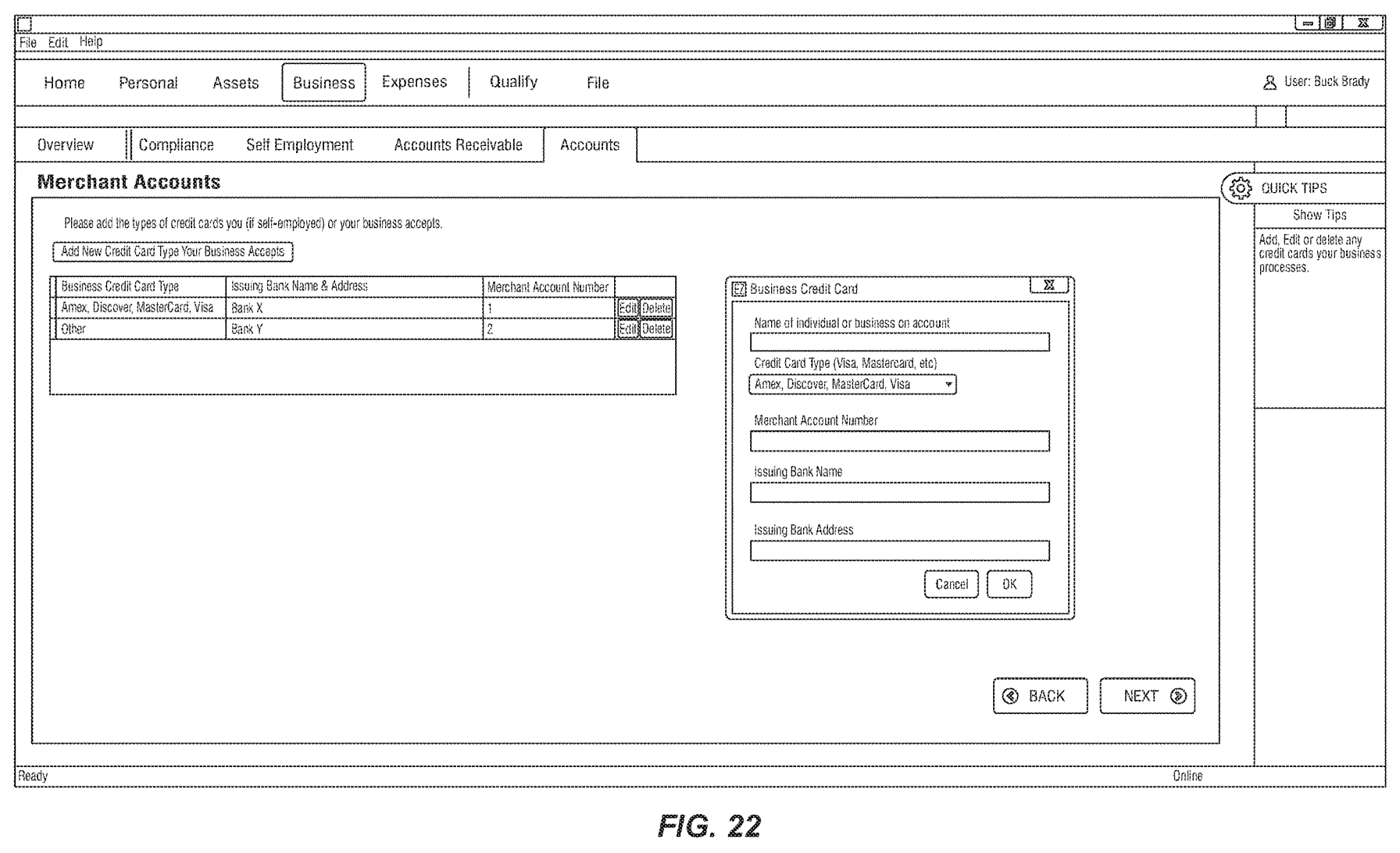

Self-Employment Information Module (see FIGS. 19-22): The user would only fill this module out if the user is self-employed. The practitioner (or user) would fill in whether there are receivables (FIG. 19); the name of the business, its Employer Identification Number (EIN), the type of business and the number of employees (FIG. 20). If there is no EIN, the program will use the taxpayer's social security number. If there are receivables, the taxpayer would be required to list the names, addresses and amounts for all outstanding receivables (FIG. 21). If customers pay by credit cards, the taxpayer would have to list what cards were used to pay the bills, including the type of credit card, the merchant account number, the issuing bank name and address, etc. (FIG. 22).

Expenses Module: In an embodiment, this is where the tax practitioner (or user) would input the actual expenses of the taxpayer (see FIGS. 23-28). The IRS, for example, may or may not allow all of the expenses, but the practitioner may negotiate for a reasonable payment plan. For example, the IRS may allow a taxpayer who owes $50,000 or less to make monthly payments as long as it can be paid in 72 months or the statute of limitations, whichever is less. The program will compute the lesser period providing that the practitioner has put in the ending date of the statute of limitations. If the net disposable income is insufficient the program will give a number that is less than full pay and is deemed to be partial pay. Thus it is very possible under an installment agreement, the taxes will not be paid in full by the end of the statute of limitations period which should in all cases equate to the last payment period.

Figure 28:
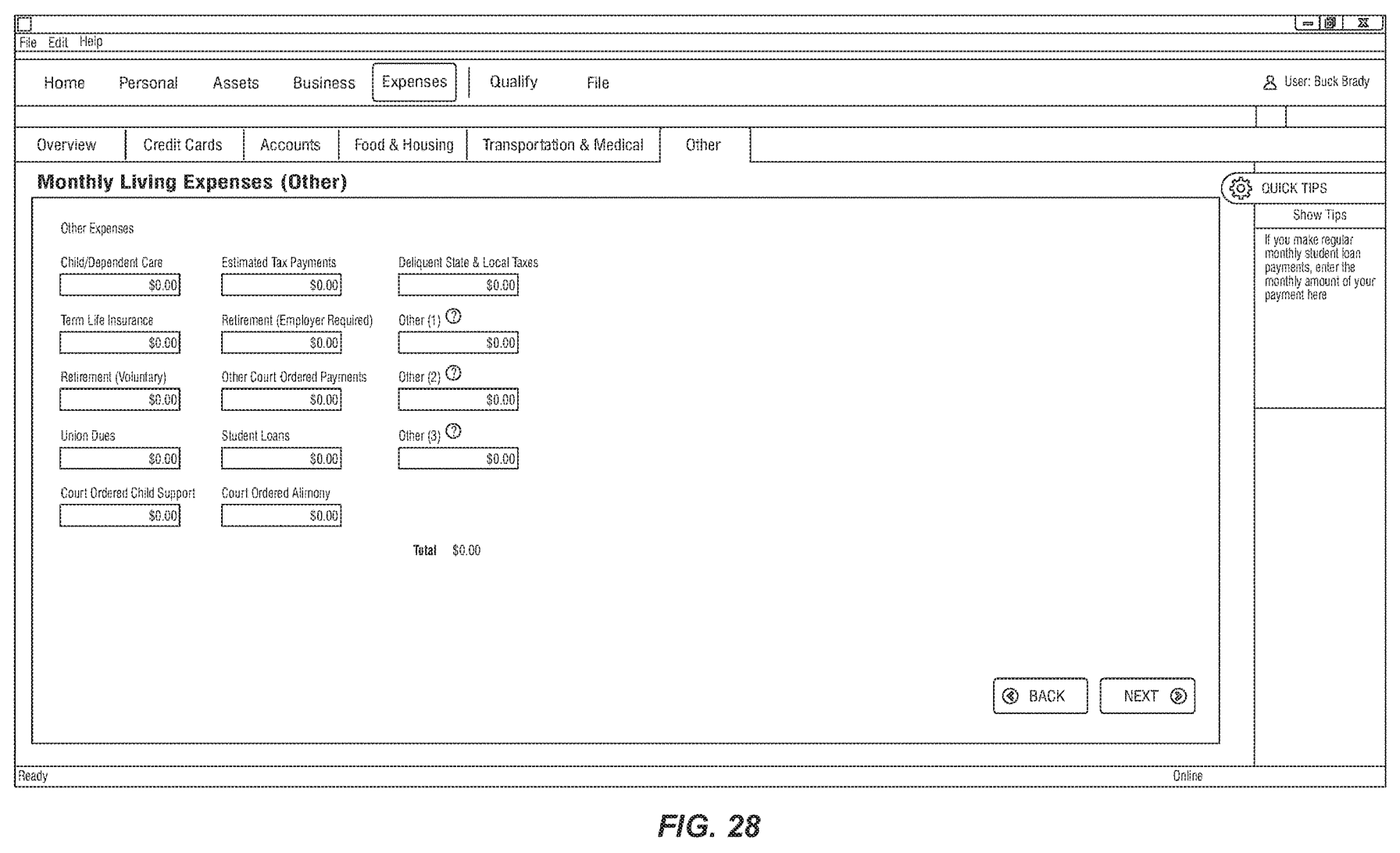

1. Credit cards (FIG. 23): the client (or taxpayer) is required to enter all credit cards with or without balances. The practitioner (or user) should be aware that if the client has a lot of credit available, then the IRS may request that some, if not all of the tax be paid in full through the credit card. This should not be the case if the amount owed is $50,000 or less and full pay can be achieved. However, a practitioner should provide the taxpayer with full knowledge of what a tax lien might do to the taxpayer's credit and the available ways to avoid the lien, if possible.
2. Bank accounts (FIGS. 24-25): This is where the taxpayer (or user) sets forth the various banks accounts, retirement accounts, CD's stocks, bonds, and so on.
4. Food and Housing expenses (FIG. 26): The practitioner (or user) would enter amounts for food, housekeeping supplies, clothing and clothing services, personal care products & services, electric, oil/gas, water/trash, telephone/cable, cell, internet, real estate taxes, insurance, maintenance and repairs, etc. With the exception of housing the practitioner can use the allowable expenses and the program will fill in the allowable numbers as opposed to actual numbers.
5. Transportation and medical expenses (FIG. 27): With the exception of transportation the user can use the national standards, which can be automatically populated by the program. The practitioner should pay close attention to someone with high medical bills, for example, as that taxpayer may indeed be entitled to both a higher medical allowance, and if appropriate due to diet, a higher food allowance.
6. Other expenses (FIG. 28). These expenses would include child dependent care, term life insurance, voluntary retirement, union dues, court order child support, court ordered alimony, student loans, other court ordered payments, employer required retirement, estimated tax payments, delinquent state and local taxes, and additional food if special diets are required, other medical and other expenses for transportation which might be allowed to a person who has a very long commute, and so on.

Resolution Information Module: In an embodiment, once all of the information has been inputted into the system, the system will categorize expenses in accordance with the tables and schedules set forth in IRS Forms 433F, 9565 or 9465FS and the tandem sheet (see FIG. 36), for example. The database contains the IRS allowable expenses, any special programs with installment agreements, such as the guaranteed installment agreement, streamline agreement, fresh start initiative, partial pay, currently not collectible and will give the lowest payment result to the tax practitioner. The system computes the best payment plan by taking into account not only the allowable IRS numbers but any special programs offered by the IRS. In addition, the program compares IRS allowable expenses to actual expenses and then shows the maximum allowable under an installment plan. The program will prepare a 3-column chart, tandem sheet based upon the database which contains the IRS allowable expenses and the actual expenses inputted by the user, as described above (See FIG. 36). This enables the user the ability to see what areas the taxpayer may be able to incur additional expenses, assuming they are bonafide, in order to minimize the amount of the installment payment. This also enables the IRS agents to look at the installment agreement and not have to input their own data from their database. This saves both the user and the IRS agent's time per installment agreement.

Forms to be Printed. In an embodiment, this module populates and prints (or otherwise presents to the user) selected schedules, forms, and other documentation for use by the user in negotiating resolution to his/her tax delinquency. The system determines the forms (i.e. the sections and lines) that will be selected and printed for the selected tax delinquency solution.

The invention has been described herein with reference to the IRS, but may be equally applicable to other state, local or federal tax agencies without departing from the scope of the invention.

In the foregoing specification, the invention has been described with reference to specific embodiments thereof and particularly with use of the IRS as a specific example. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for tax delinquency resolution and analysis; however, the invention can be used for any delinquency resolution and analysis in general. Additionally and obviously, features may be added or subtracted as desired. Accordingly, the invention is not to be restricted except in light of the attached claims and their equivalents.

What is claimed is:

1. A tax delinquency resolution and analysis server system comprising, at least, a user account database, a tax compliance and repayment analysis engine, and an inference engine, wherein the tax compliance and repayment analysis engine is communicatively coupled to a government tax systems interface, and wherein the tax delinquency resolution and analysis server system is configured to run a computer program product for tax compliance and delinquency resolution, the computer program product comprising non-transitory computer-readable media encoded with instructions for execution by a processor to perform a method comprising:

creating one or more training datasets comprising a positive set of training documents and a negative set of training documents, wherein said one or more training datasets comprises electronic data corresponding to positive and negative delinquent tax resolutions;

using said one or more training datasets to train one or more deep learning algorithms comprising at least one or more filters, wherein the one or more filters is trained according to a particular tax delinquency;

obtaining a user's financial data comprising personal information, tax delinquency, asset information and expenses;

obtaining tax data comprising current tax rules and procedures and other tax relief programs from a tax agency system based on said user's financial data;

generating one or more electronic solutions to said user's tax delinquency based on said user's financial data and said tax data;

passing said one or more electronic solutions through said one or more filters; and applying said one or more deep learning algorithms to said one or more electronic solutions to obtain a document containing a proposed course of action for use by the user in negotiating resolution of the user's tax delinquency with the tax agency.

2. The method of claim 1, wherein the one or more training datasets are obtained by mining one or more government tax databases.

3. The method of claim 1, wherein the one or more training datasets includes data provided by tax experts as models for tax delinquency resolution.

4. The method of claim 2, wherein the government tax databases is obtained by processing textual data from the government tax systems interface.

5. The method of claim 1, further comprising presenting instructions to the user for negotiation with the tax agency.

6. The method of claim 1, wherein at least one of the one or more electronic solutions is Currently not Collectible.

7. The method of claim 1, further comprising adding said optimal solution to said positive set of training documents if the solution is accepted by the tax agency and to the negative set of training documents if the solution is rejected by the tax agency.

8. A delinquency resolution and analysis system, comprising: a tax delinquency resolution and analysis server system comprising a processor communicatively coupled to a network for access by one or more end-user devices, wherein the delinquency resolution and analysis system is configured to process and compare over 144,000 data points;
   a user account database coupled to the tax delinquency resolution and analysis server system, the user account database storing data provided by the user related to the user's financial circumstances, including data related to the user's tax delinquency;
   wherein the tax delinquency resolution and analysis server system is configured to: create one or more training datasets comprising a positive set of training documents and a negative set of training documents, wherein said one or more training datasets comprises textual data corresponding to positive and negative delinquent tax resolutions;
   train one or more deep learning algorithms comprising at least one or more filters with said one or more training datasets;
   receive the data related to the user's financial circumstances, and data related to current tax rules and procedures;
   generate one or more potential solutions to said user's tax delinquency based on said user's financial data and said tax data;
   pass said one or more potential solutions through the one or more filters;
   apply said one or more deep learning algorithms to said filtered one or more potential solutions to obtain an optimal solution from said one or more potential solutions;
   generate one or more documents associated with the optimal solution for use by the user in negotiating resolution of the user's tax delinquency; and
   add said optimal solution to said positive set of training documents if the optimal solution is accepted by the tax agency and to the negative set of training documents if the optimal solution is rejected by the tax agency.

9. The delinquency resolution and analysis system of claim 8, wherein the tax delinquency resolution and analysis server system further communicates with the tax agency's information system to retrieve the over 144,000 data points and/or current tax codes.

10. The delinquency resolution and analysis system of claim 8, wherein the tax delinquency resolution and analysis server system further comprises an inference engine to infer further data related to the user's financial circumstances from the received data.

11. The delinquency resolution and analysis system of claim 8, wherein the tax delinquency resolution and analysis server system further presents instructions for negotiation with the tax agency.

12. The delinquency resolution and analysis system of claim 8, wherein at least one of the one or more potential solutions is Currently not Collectible.

* * * * *